United States Patent
Wang

(10) Patent No.: US 10,768,585 B2
(45) Date of Patent: Sep. 8, 2020

(54) SYSTEM AND METHOD FOR DATA-DRIVEN CONTROL WITH PARTIALLY UNKNOWN FEEDBACK

(71) Applicant: Mitsubishi Electric Research Laboratories, Inc., Cambridge, MA (US)

(72) Inventor: Yebin Wang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 103 days.

(21) Appl. No.: 16/007,372

(22) Filed: Jun. 13, 2018

(65) Prior Publication Data
US 2019/0384237 A1 Dec. 19, 2019

(51) Int. Cl.
G05B 13/04 (2006.01)
(52) U.S. Cl.
CPC .................................. *G05B 13/042* (2013.01)
(58) Field of Classification Search
CPC .................................................. G05B 13/042
See application file for complete search history.

(56) References Cited

U.S. PATENT DOCUMENTS

| 2001/0010453 A1* | 8/2001 | Marcinkiewicz | H02P 25/08 318/727 |
| 2004/0135534 A1* | 7/2004 | Cullen | G05B 17/02 318/609 |
| 2015/0246685 A1* | 9/2015 | Dixon | H02P 21/22 701/42 |

OTHER PUBLICATIONS

Lewis et al. "Reinforcement Learning for Partially Observable Dynamic Processes: Adaptive Dynamic Programming using Measured Output Data," IEEE Transactions on Systems, Man and Cybernetics. Part B: Cybernetics, IEEE Service Center, Piscataway, NJ, US. vol. 41, No. 1. Feb. 1, 2011, pp. 14-25.

(Continued)

*Primary Examiner* — Ronald D Hartman, Jr.
(74) *Attorney, Agent, or Firm* — Gennadiy Vinokur; James McAleenan; Hironori Tsukamoto

(57) ABSTRACT

A control system controls a machine according to a control policy parameterized on a lifted state space of the machine having an unknown onto mapping to a state space of the machine. The control system accepts measurements of state variables that form a portion of the state of the machine and determines a derivative of at least one measured state variable using values of the state variable measured for multiple time instances, such that a combination of the measured state variables and the derivative of the at least one measured state variable defines the lifted state for the time instance. The control system updates the control policy by evaluating a value function of the control policy using the lifted states, such that a control input to the machine is determined using the lifted state and the updated control policy.

20 Claims, 22 Drawing Sheets

(56) References Cited

OTHER PUBLICATIONS

Martinelli Agostino, "Extension of the Observability Rank Condition to Nonlinear Systems Driven by Unknown Inputs," 2015 23rd Mediterranean Conference on Control and Automation, IEEE, Jun. 16, 2015, pp. 589-595.

Lewis et al., "Reinforcement Learning for Partially Observable Dynamic Processes: Adaptive Dynamic Programming Using Measured Output Data" IEEE Transactions on Systems, Man, and Cybernetics—Part B: Cybernetics, vol. 41, No. 1, Feb. 2011. pp. 14-25.

Gao et al., "Adaptive and Optimal Output Feedback Control of Linear Systems: An Adaptive Dynamic Programming Approach." Proceeding of the 11th World Congress on Intelligent Control and Automation . Shenyang, China, Jun. 29-Jul. 4, 2014. pp. 2085-2090.

\* cited by examiner $$z = (y, \int_0^t y\,dt, \dot{y}, \ldots, y^{(m-1)})$$

211

$$z = (y, \int_0^t y\,dt, \dot{y})$$

$z = (y_a, \dot{y}, ..., y^{(m-1)})$ — 221

$z = (y_a, \dot{y})$ — 222

FIG. 2C

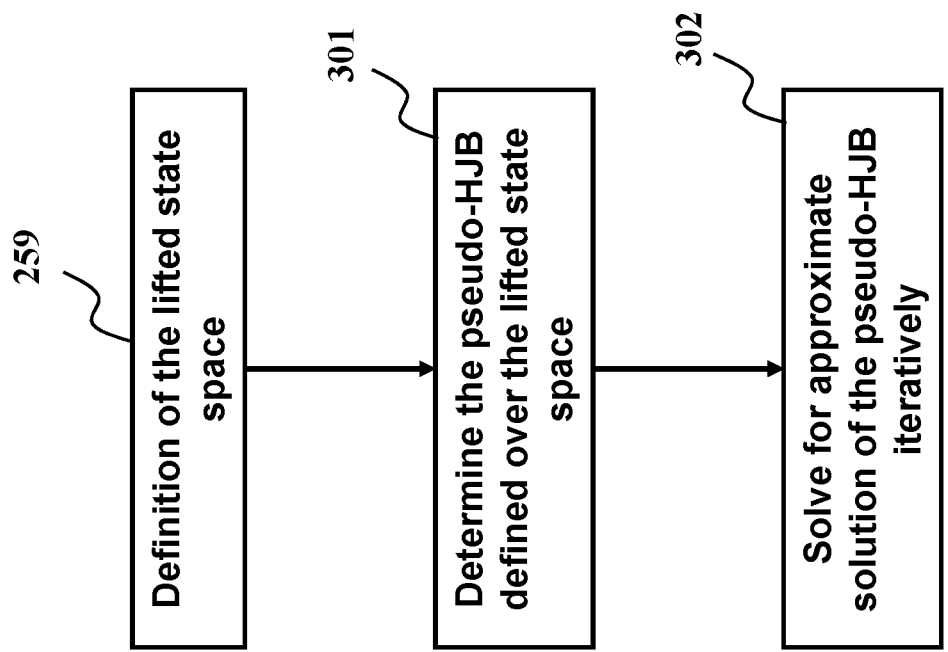

1: Data-driven PI

Initialize $i = 0, j = 0, t_0 = 0, \delta, M_1, M_2, \Theta_0^{V_{\theta}}$;
Define an initial admissible output feedback control policy $$K_0(\varrho) = -\frac{1}{2} R^{-1} \Theta_0^{V_{\theta}} \phi \nabla \varrho(\varrho).$$

$t_s = t_0$;
for $i \leq M_1$ do
  Initialize $t_s = t_s + j\delta$;
  $j = 0, \Psi = 0, \rho = 0$;
  while $j \leq M_2$ do
    $t = t_s + j\delta$;
    Let $v_j(t)$ be a vector of small constants over $[t_s, t + \delta]$;
    $a_j(\varrho) = K_i(\varrho) + v_j(t)$;
    calculate $\Psi(t), \rho(t)$;
    Update $\Psi = [\Psi, \Psi(t)]; \rho = [\rho, \rho(t)]$;
    $j = j + 1$;
    if $\det(\Psi(\Psi)^T) \neq 0$ then
      Solve $(\theta)$ for $\Theta_i$;
      Update $K_{i+1} = -\frac{1}{2} R^{-1} \Theta_i^{V_{\theta}} \phi \nabla \varrho(\varrho)$;
      break;
  $i = i + 1$;
  if $|\Theta_{i-1} - \Theta_i| < \epsilon$ then
    break;
return $\Theta_{i-1}$;

SYSTEM AND METHOD FOR DATA-DRIVEN CONTROL WITH PARTIALLY UNKNOWN FEEDBACK

TECHNICAL FIELD

This invention relates generally to an adaptive control, and more particularly to a data-driven output feedback control of a system with partially observed performance.

BACKGROUND

Reinforcement learning (RL) is a class of methods used in machine learning to methodically modify the actions of an agent based on observed responses from its environment. RL can be applied where standard supervised learning is not applicable, and requires less a priori knowledge. In view of the advantages offered by RL methods, a recent objective of control system researchers is to introduce and develop RL techniques that result in optimal feedback controllers for dynamical systems that can be described in terms of ordinary differential equations. This includes most of the human-engineered systems, including aerospace systems, vehicles, robotic systems, electric motors, and many classes of industrial processes.

Optimal control is generally an offline design technique that requires full knowledge of the system dynamics, e.g., in the linear system case, one must solve the Riccati equation. On the other hand, adaptive control is a body of online methods that use measured data along system trajectories to learn to compensate for unknown system dynamics, disturbances, and modeling errors to provide guaranteed performance. Optimal adaptive controllers have been designed using indirect techniques, whereby the unknown machine is first identified and then a Riccati equation is solved. Inverse adaptive controllers have been provided that optimize a performance index, meaningful but not of the designer's choice.

Direct adaptive controllers that converge to optimal solutions for unknown systems are generally underdeveloped. However, various policy iteration (PI) and value iteration (VI) methods have been developed to solve online the HamiltonJacobiBellman (HJB) equation associated with the optimal control problem. Notably, such methods require measurement of the entire state vector of the dynamical system to be controlled.

For example, PI refers to a class of methods built as a two-step iteration: policy evaluation and policy improvement. Instead of trying a direct approach to solving the HJB equation, the PI starts by evaluating the cost/value of a given initial admissible (stabilizing) controller. The cost associated with this policy is then used to obtain a new improved control policy (i.e., a control policy that will have a lower associated cost than the previous one). This is often accomplished by minimizing a Hamiltonian function with respect to the new cost. The resulting policy is thus obtained based on a greedy policy update with respect to the new cost. These two steps of policy evaluation and policy improvement are repeated until the policy improvement step no longer changes the actual policy, and convergence to the optimal controller is achieved. One must note that the infinite horizon cost associated with a given policy can only be evaluated in the case of an admissible control policy, meaning that the control policy must be stabilizing.

Approximate dynamic programming (ADP is a class of reinforcement learning methods that have shown their importance in a variety of applications, including feedback control of dynamical systems. ADP generally requires full information about the system internal states, which is usually not available in practical situations. Indeed, although various control algorithms (e.g., state feedback) require full state knowledge, in practical implementations, taking measurements of the entire state vector is not feasible.

The state vector is generally estimated based on partial information about the system available by measuring the system's outputs. However, the state estimation techniques require a known model of the system dynamics. Unfortunately, in some situations, it is difficult to design and implement optimal state estimators because the system dynamics are not exactly known.

The lack of full state of the system makes ADP inapplicable to adaptive control application, which is undesirable. Accordingly, there is a need for a system and a method for data-driven output feedback control of a system with only partially observable state and underdetermined dynamic.

SUMMARY

It is an object of some embodiments to provide a system and a method for data-driven output feedback control of a system with observable output representing only a portion of a state of the system with underdetermined dynamic. It is another object to provide approximate dynamic programming (ADP) solution for adaptive control of a system with partially observable state and underdetermined dynamic.

Some embodiments are based on recognition ADP generally requires full information about the system internal states, which is usually not available in practical situations. If the full state is unavailable, the ADP methods using partial state can end up with a control policy which destabilize the control of the system.

However, some embodiments are based on realization that the state of the system is not the objective of the ADP, but just a space of parameterization of ADP solution that ensures stability of control. In other words, any other space of ADP parameterization that ensure the stability of control is suitable for ADP based adaptive control.

Some embodiments are based on realization that any space that includes the state space can ensure stability of ADP based adaptive control. Such a space is referred herein as a lifted state space. Moreover, the relationship between the state space and the lifted state space is not important and can remain unknown. In other words, if the lifted state space of a system has an unknown onto mapping to the state space of the system, such a lifted state space can be used to parameterize ADP based adaptive control to ensure a stable control of the system.

Some embodiments are based on recognition that the lifting of the state space onto the lifted state space can be done based on the dynamics of the control system. When the dynamics of the system is unknown, such a lifting can be done in a predictable manner resulting in a known onto mapping between the state space and the lifted state space. When the system dynamics are not unknown, there is a need for a way of uplifting state space for the unknown dynamics even if the resulting onto mapping becomes unknown.

Some embodiments are based on realization that the unknown dynamics of the control system can be captured by derivatives of time-series output data of the operation of the system. Indeed, the derivative of at least one measured state variable can be determined with values of the state variable measured for multiple time instances and thus captures the unknown dynamics of the system. In addition, the determination of the derivative is computationally efficient for different types of the systems.

Armed with this understanding, it is further realized that measured state variables of the system and derivatives of the measured state of the system can form such a lifted state space. The order of derivatives depends on the structure of the control system. However, even the high order of derivatives can be produced in a computationally efficient manner avoiding reliance on underdetermined model of dynamics of the system and allowing to avoid measuring the full state of the controlled system.

To that end, some embodiments change the parameterization of the ADP based adaptive control from the state space of the controlled system to a lifted state space of the control system. For example, some embodiments parametrize one or combination of a state space, a control policy, a gradient of the control policy, and a value function of the ADP based adaptive control over the lifted state space.

According to principles of the ADP based adaptive control, the system is controlled according to a control policy updated online during the control of the system based on the outputs of the system. For example, as used herein, the control policy parameterized on a lifted state space means that the control policy is a function accepting as an argument an instance of the lifted state space to output a control input to the system based on a values of the instance of the lifted state space and values of the coefficients of the function. As used herein, the update of the control policy is the update of at least one coefficient of the function. The coefficient of the function should not be confused with the inputs/arguments and the outputs of the function.

Accordingly, one embodiment discloses a control system for controlling a machine. The control system includes a controller to control a machine according to a control policy parameterized on a lifted state space of the machine having an unknown onto mapping to a state space of the machine, wherein a state of the machine is an instance in the state space that uniquely defines the machine at a time instance, wherein a lifted state of the machine is an instance in the lifted state space that defines the machine at the time instance, such that the lifted state space at the time instance has the unknown onto mapping to the state of the machine at the time instance; a receiver to accept a sequence of measurements of state variables measured over a sequence of time instances, the state variables measured for the time instance form a portion of the state of the machine at the time instance; a differentiator to determine, for the time instance, a derivative of at least one measured state variable using values of the state variable measured for multiple time instances, wherein a combination of the measured state variables and the derivative of the at least one measured state variable defines the lifted state for the time instance; and a processor to update the control policy by evaluating a value function of the control policy using the lifted states, such that the controller determines a control input to the machine using the lifted state and the updated control policy.

Another embodiment discloses a control method for controlling a machine. The method uses a processor coupled with stored instructions implementing the method, wherein the instructions, when executed by the processor carry out at least some steps of the method, including controlling a machine according to a control policy parameterized on a lifted state space of the machine having an unknown onto mapping to a state space of the machine, wherein a state of the machine is an instance in the state space that uniquely defines the machine at a time instance, wherein a lifted state of the machine is an instance in the lifted state space that defines the machine at the time instance, such that the lifted state space at the time instance has the unknown onto mapping to the state of the machine at the time instance; accepting a sequence of measurements of state variables measured over a sequence of time instances, the state variables measured for the time instance form a portion of the state of the machine at the time instance; determining, for the time instance, a derivative of at least one measured state variable using values of the state variable measured for multiple time instances, wherein a combination of the measured state variables and the derivative of the at least one measured state variable defines the lifted state for the time instance; and updating the control policy by evaluating a value function of the control policy using the lifted states, such that the controller determines a control input to the machine using the lifted state and the updated control policy.

Yet another embodiment discloses a non-transitory computer readable storage medium embodied thereon a program executable by a processor for performing a method, the method includes controlling a machine according to a control policy parameterized on a lifted state space of the machine having an unknown onto mapping to a state space of the machine, wherein a state of the machine is an instance in the state space that uniquely defines the machine at a time instance, wherein a lifted state of the machine is an instance in the lifted state space that defines the machine at the time instance, such that the lifted state space at the time instance has the unknown onto mapping to the state of the machine at the time instance; accepting a sequence of measurements of state variables measured over a sequence of time instances, the state variables measured for the time instance form a portion of the state of the machine at the time instance; determining, for the time instance, a derivative of at least one measured state variable using values of the state variable measured for multiple time instances, wherein a combination of the measured state variables and the derivative of the at least one measured state variable defines the lifted state for the time instance; and updating the control policy by evaluating a value function of the control policy using the lifted states, such that the controller determines a control input to the machine using the lifted state and the updated control policy.

BRIEF DESCRIPTION OF THE DRAWINGS

FIGS. 2A, 2B, 2C, and 2D show schematics of different implementations of functions of the differentiator according to some embodiments.

FIG. 3 shows a general block diagram of a method for constructing a data-driven output feedback optimal control policy for a machine without knowing its dynamics and state according to some embodiments.

FIG. 6B shows a pseudo code of one exemplar implementation of the embodiment of FIG. 6A.

FIG. 7C shows a pseudo code of one exemplar implementation of embodiments of FIGS. 7A and/or 7B.

DETAILED DESCRIPTION

Figure 1A:
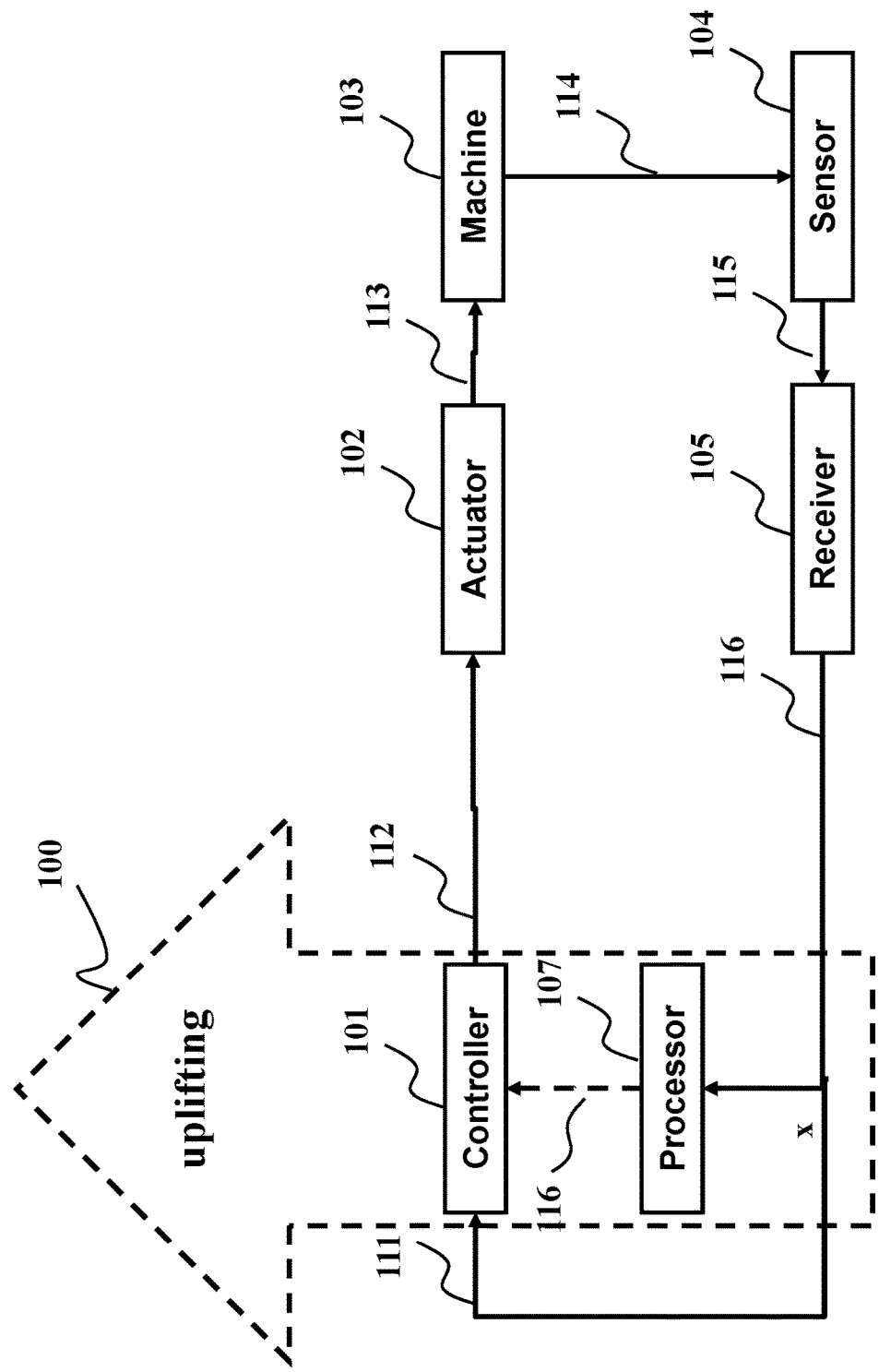
FIG. 1A shows a schematic of some principles employed by some embodiments for a data-driven state feedback optimal control policy via the ADP based adaptive control.

FIG. 1A shows a schematic of some principles employed by some embodiments for a data-driven state feedback optimal control policy via the ADP based adaptive control. The ADP based adaptive control performs iteratively. For simplicity of presentation, this disclosure discusses methodology within one iteration, which can be repeated as long as necessary for the control application.

A machine, as used herein, is any apparatus that can be controlled by an input signal (input). The input signal can be associated with physical quantities, such as voltages, pressures, forces, etc. The machine produces an output signal (output). The output can represent a motion of the machine and can be associated with other physical quantities, such as currents, flows, velocities, positions. Typically, the output is related to a part or all of the previous output signals, and to a part or all of the previous and current input signals. However, the outputted motion of the machine may not be realizable due to constraints on the machine during its operation. The input and output are processed by a controller.

The operation of the machine can be modeled by a set of equations representing changes of the output over time as functions of current and previous inputs and previous outputs. During the operation, the machine can be defined by a state of the machine. The state of the machine is any set of information, in general time varying, that together with the model and future inputs, can define future motion. For example, the state of the machine can include an appropriate subset of current and past inputs and outputs.

The control system for controlling the machine includes a processor for performing a method, and a memory for storing the model. The method is performed during fixed or variable periods. The controller receives the machine output and the machine motion. The controller uses the output and motion to generate the input for the machine.

Some embodiments consider a dynamical machine $$\dot{x}=f(x)+g(x)u,\ x(0)=x_0\in\Omega_x$$

$$y=h(x),\quad(1)$$

where $x\in\Omega_x\subset R^{n_x}$ the machine state vector, $\Omega_x$ a compact set containing the origin in its interior, $u\in R^m$ the control input, $f:R^{n_x}\times R^m\to R^{n_x}$ is a vector field, $g:R^{n_x}\to R^{n_x\times m}$ consists of m smooth vector fields, and $h:R^{n_x}\to R^p$ is a vector of p smooth functions. A state feedback control policy $u(x)\in U_x\subset C^1[0,T]$ is admissible if, for any initial condition $x_0\in\Omega_x$, the resultant closed-loop system is stable. Correspondingly, $U_x$ is called the admissible state feedback control set. Further, a state feedback optimal control design is to construct $u(x)$ minimizing the following cost functional $$J(u)=\int_0^\infty [y^T Qy+u^T Ru]dt,\quad(2)$$

where Q and R are positive definite matrices. It is without loss of generality to take the cost function (2) with T=∞. For such a case, an admissible state feedback control policy should yield a finite value of the cost function, and a stable closed-loop system. The state feedback optimal control problem for machine (1) can be formulated as: Given a machine (1), find $u^*(x^*)\in U_x$ which minimizes the cost function (2), i.e.

$$u^*(x^*)=\arg\min_{u(x)\in U_x} J(u(x)).$$

According to dynamic programming, the solution $u^*(x)$ to the state feedback optimal control problem can be obtained by solving the Hamilton-Jacobi-Bellman (HJB) equations $$0=\min_{u\in U_x}\{\nabla V(f+gu)+(h(x))^T Qh(x)+u^T Ru\},\quad(3)$$

with $V(x(\infty))=0$ and $\nabla V=\partial V/\partial x$. A closed-form solution of HJB is notoriously difficult to establish. Instead, Adaptive Dynamic Programming (ADP) techniques, e.g. Policy Iteration (PI) or Value Iteration (VI), are exploited to acquire an approximate solution. Due to the similarity between PI and VI, this disclosure focuses on PI methods, but skilled artisan would readily recognize the extensions of some embodiments to VI methods.

PI for the machine (1) with state measurements is to solve the optimal state feedback policy. PI is summarized in the following two iterated steps, with i=0, 1, .... Assume that an admissible state feedback control policy $u_0(x)$ is known. Then PI provides for policy evaluation that solves for the positive definite function $V_i(x)$ satisfying $$\Delta V_i(f(x)+g(x)u_i(x))+y^T Qy+u_i^T(x)Ru_i(x)=0,\forall x\in\Omega_x,\quad(4)$$

where $\Delta V_i=\partial V_i(x)/\partial x$ is a row vector, and $u_i(x)$ is the state feedback control policy during the ith iteration. Next, the PI provides for policy improvement that updates the control policy according to $$u_{i+1}(x)=-\frac{1}{2}R^{-1}(\nabla V_i g)^T.\quad(5)$$

Such a formulation forms a system of first order linear partial differential equations (PDEs), for which the closed-form solution of pseudo-HJB (4) remains difficult to establish. Instead, an approximate solution is practically of interest. Given parameterizations of $u_i$ and $V_i$, the pseudo-HJB (4) can be casted into algebraic equations, and the approximate solution can be computed. The two steps (4)-(5) shall be repeated until the convergence is attained.

The ADP for state feedback optimal control policy requires the measurement of the full machine state. Its success has been particularly acclaimed when the machine is linear time-invariant (LTI), for example, state feedback optimal stabilization, state feedback optimal output regulation, etc. When the machine is nonlinear, its applications have been restrictively limited to the state feedback case, for instance, state feedback optimal stabilization. To our best knowledge, the endeavor in resolving data-driven output feedback optimal control for nonlinear machines turns out to be vain so far.

To that end, in some embodiments, for a current, e.g. ith, iteration, a controller implements 101 a state feedback control policy $u_i(x)$ and determines a control command $u_i(x(t))$ 112 at any time instant t based on the state $x(t)$ 111, where $x(t)$ is received 106 from sensors 104 sensing a machine 103. Actuator 102 generates physical quantities 113 as inputs of the machine 103. A processor 107 collects a sequence of state $x(t_1), \ldots, x(t_N)$ at various time instants $t_1, \ldots, t_N$ during a time interval $[t_1, t_N]$, and determines a new state feedback control policy $u_{i+1}(x)$, by resorting to the PI. It is carried out on the basis of solving pseudo-HJB iteratively, where the pseudo-HJB is defined over the state x. The new state feedback control policy updates 116 the controller 101 for real-time control after time $t_N$.

Physical meaning of the control command 112, types of actuators 102 and physical quantities 113 vary wildly, depending on the machine. As an example, when the machine is a three-phase AC electric motor, the actuator could be a voltage source inverter. The inverter outputs three-phase voltages to the motor. In a temperature control example, the control command 112 may represent the percentages of opening of a value of a refrigerant pipe, whereas the actuator could be an electromagnetic valve, and the 113 represents a flow rate of the refrigerant in the pipe.

Some embodiments disclose a method to solve the data-driven output feedback optimal control problem via a modified PI, where only machine output y, not the full state x, is sensed by sensors and used in the modified PI. As shown in FIG. 1A, at each time instant t, the sensor senses 104 the operation of the machine 103 and generates an instance of the machine output $y(t)$ 115. The machine output $y(t)$ contain partial information about the state $x(t)$ making ADP adaptive control unstable. Blindly replacing x 116 in FIG. 1A with y, which means the output feedback control policy takes the expression of $u_i(y)$, could not ensure that a new output control policy $u_{i+1}(y)$ based on the stabilizing $u_i(y)$ can stabilize the machine. Although an estimator can infer the machine state from its output y, it generally requires good knowledge of $f,g$ function in the model of dynamics of the machine. However, various embodiments address the situation when the machine model is completely unknown or largely unknown, i.e., $f,g$ are totally or partly unknown. In such scenarios, an estimator is hardly useful to obtain the machine state x.

Some embodiments are based on recognition that it can be beneficial to choose a proper parametrization (form) of admissible output feedback control policies, since the parametrization affects the stability of the resultant closed-loop system. As the PI process runs iteratively, it comes up with a new control policy based on an old one. It is ideal to establish properties of the control policy ensuring that the new control policy out for next iteration stabilizes the machine as long as the old one does.

Specifically, some embodiments are based on realization that the state of the system is not the objective of the ADP, but just a space of parameterization of ADP solution that ensures stability of control. In other words, any other space of ADP parameterization that ensure the stability of control is suitable for ADP based adaptive control.

Some embodiments are based on realization that any space that includes the state space can ensure stability of ADP based adaptive control. Such a space is referred herein as a lifted state space. Moreover, the relationship between the state space and the lifted state space is not important and can remain unknown. In other words, if the lifted state space of a system has an unknown onto mapping to the state space of the system, such a lifted state space can be used to parameterize ADP based adaptive control to ensure a stable control of the system.

To that end, some embodiments uplift 100 the ADP based adaptive control from the state space of the machine to the lifted state space. As used herein, a state of the machine is an instance in the state space that uniquely defines the machine at a time instance. For example, if the machine is an electric motor, the state of the electric motor includes a current through the motor, a speed of a rotor of the motor, and a flux of the motor. As used herein, a lifted state of the system is an instance in the lifted state space that defines the machine at the time instance, such that the lifted state space at the time instance has the unknown onto mapping to the state of the system at the time instance.

Figure 1B:
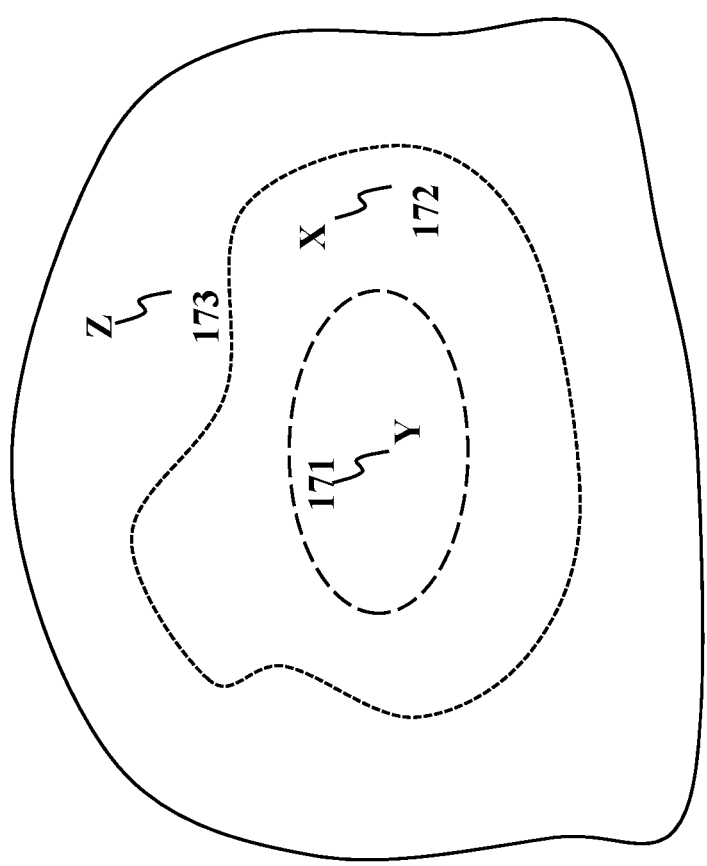
FIG. 1B shows a schematic of the relationship between the machine output, the state of the machine, and the lift state of the machine used by some embodiments.

FIG. 1B shows a schematic of the relationship between the machine output y, also referred herein as measured state variables, the state x, and the lift state z used by some embodiments. All machine outputs constitute an output space $Y \subset R^p$ 171, all machine state constitute a state space $X \subset R^{n_x}$ 172, and all lifted states constitute the lifted state space $Z \subset R^{n_z}$ 173. The machine output at a time instant $y(t)$ is an instance of the output space; the machine state at a time instant $x(t)$ is an instance of the state space; the lifted state at a time instant $z(t)$ is an instance of the lifted state space. Typically, the dimension of Y is lower than that of X, i.e., $p<n_x$. The output space is a subspace of the state space, i.e., space Y is contained by the state space X. Similarly, the lifted state space Z is typically larger than that of the state space, i.e., $n_z>n_x$.

Figure 1C:
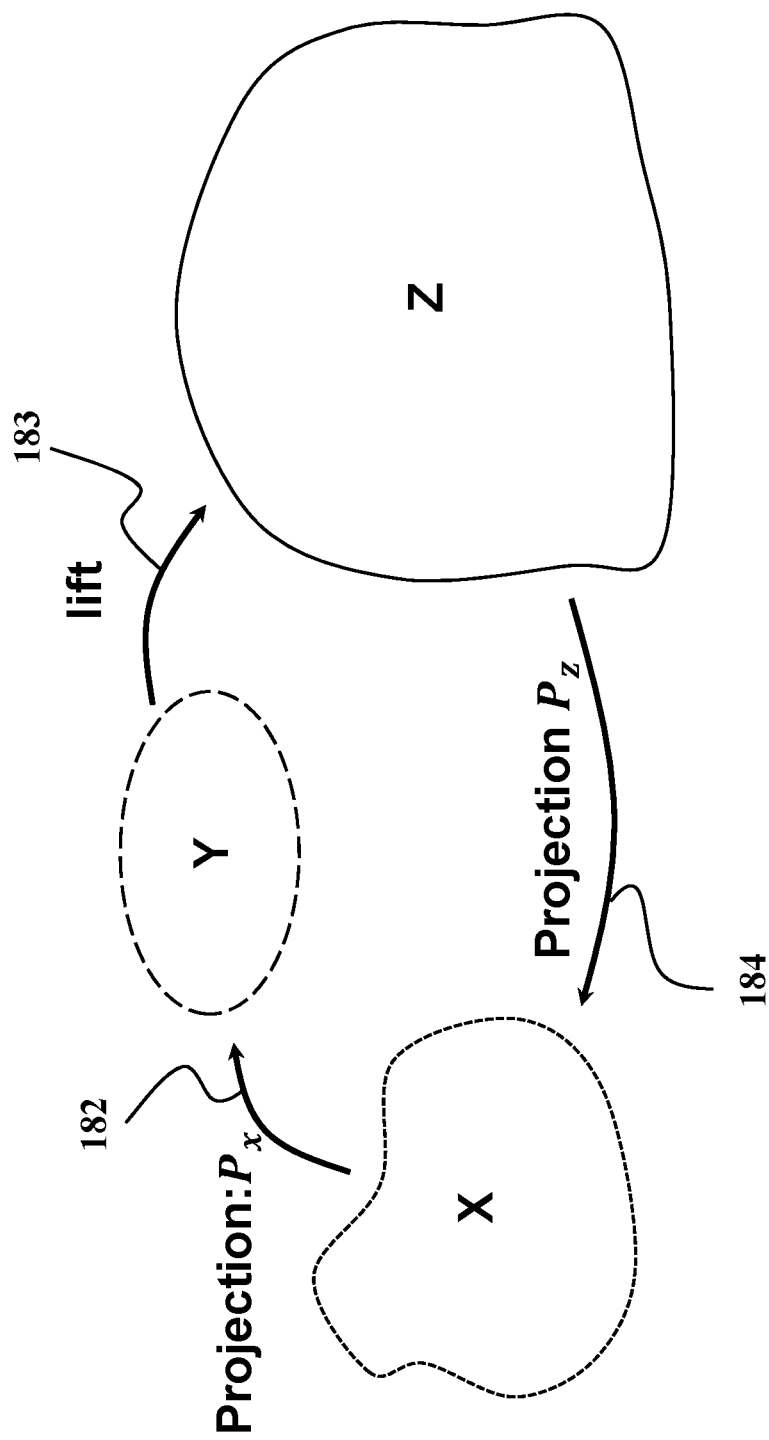
FIG. 1C shows a schematic of the mappings between the machine output, the state of the machine, and the lift state of the machine used by some embodiments.

FIG. 1C shows a schematic of the mappings between the machine output y, the state x, and the lift state z used by some embodiments. For example, the state space $x(t)$ contains more information than measured state variables $y(t)$, which means given $x(t)$, $y(t)$ can be uniquely determined by projecting 182 $x(t)$ toward Y: $y=P_x(x)$. It is realized that the lifted state space Z can be defined in such a way that any instance $z(t)$ includes at least as much information as an instance $x(t)$ of the state space. That is: given any $z(t)$, $x(t)$ can be uniquely determined by an onto projecting 184 $z(t)$ onto X: $x=P_z(z)$.

To that end, there is a need for lifting 183 from Y to Z that satisfies the rules for the projection 184. Such a lifting can be ensured when there is an onto mapping between spaces X and Z. As used herein, in onto mapping of two space or domains, each element of the codomain is mapped to by at least one element of the domain. In mathematical terms, the onto mapping is represented by a function f from a set Z to a set X is surjective (or onto), or a surjection, if for every element x in the codomain x of $f$ there is at least one element z in the domain Z of $f$ such that f(z)=x. It is not required that z is unique; the function $f$ may map one or more elements of Z to the same element of X.

Some embodiments are based on recognition that the full lifting of the state space onto the lifted state space can be done based on the dynamics of the control system. When the dynamics of the system is known, such a lifting can be done in a predictable manner resulting in a known onto mapping between the state space and the lifted state space. When the system dynamics are not unknown, there is a need for a way of uplifting state space for the unknown dynamics even if the resulting onto mapping becomes unknown.

Some embodiments are based on realization that the unknown dynamics of the control system can be captured by derivatives of time-series output data of the operation of the system. Indeed, the derivative of at least one measured state variable can be determined with values of the state variable measured for multiple time instances and thus captures the unknown dynamics of the system. In addition, the determination of the derivative is computationally efficient for different types of the systems.

Armed with this understanding, it is further realized that measured state variables of the system and derivatives of the measured state of the system can form such a lifted state space. The order of derivatives depends on the structure of the control system. However, even the high order of derivatives can be produced in a computationally efficient manner avoiding reliance on underdetermined model of dynamics of the system and allowing to avoid measuring the full state of the controlled system.

Figure 1D:
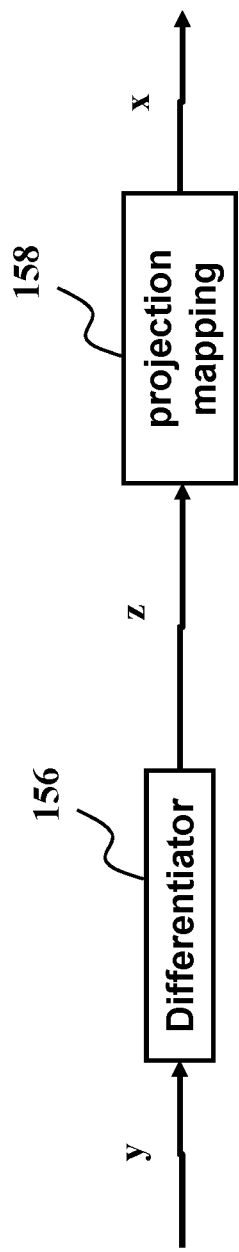
FIG. 1D shows a schematic of achieving a desired lifting through derivatives of measured state variables according to some embodiments.

FIG. 1D shows a schematic of achieving a desired lifting through derivatives of measured state variables according to some embodiments. For example, the lifting operation is achieved by the differentiator 156, such that a combination of the measured state variables and the derivatives of the at least one measured state variable defines the lifted state that ensures that there exists an onto projection mapping 158, i.e., $P_z:Z \to X$.

Figure 1E:
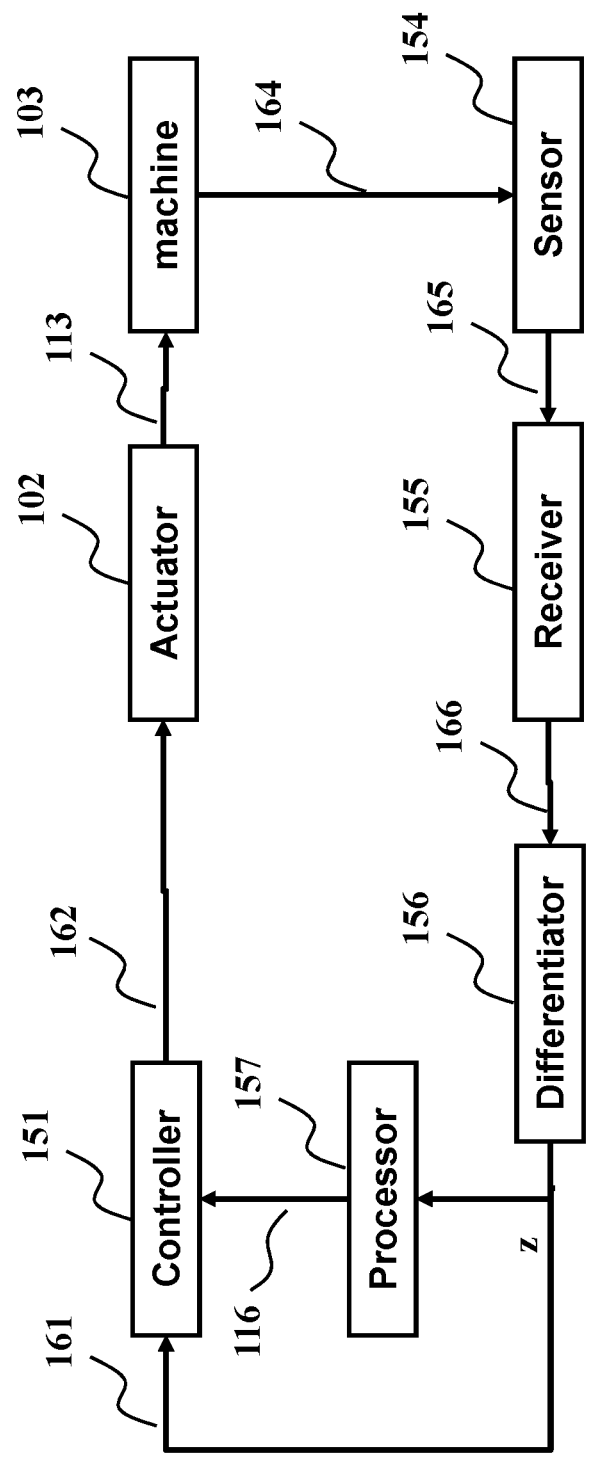
FIG. 1E shows a block diagram of a control system for controlling a machine according to some embodiments.

FIG. 1E shows a block diagram of a control system for controlling a machine 103 according to some embodiments. The control system includes a controller 151 to control a machine 103 according to a control policy parameterized on a lifted state space of the machine having an unknown onto mapping to a state space of the machine. As used herein, a state of the machine is an instance in the state space that uniquely defines the machine at a time instance. A lifted state of the machine is an instance in the lifted state space that defines the machine at the time instance, such that the lifted state space at the time instance has the unknown onto mapping to the state of the machine at the time instance.

The control system includes a receiver 155 to accept a sequence of measurements of state variables 165 measured by a sensor 154 over a sequence of time instances 164. The state variables measured for the time instance form a portion of the state of the machine at the time instance.

The control system includes a differentiator 156 to determine, for the time instance, a derivative of at least one measured state variable 166 using values of the state variable measured for multiple time instances. In various embodiments, a combination of the measured state variables and the derivative of the at least one measured state variable defines the lifted state for the time instance.

Further, the control system includes a processor to update the control policy by evaluating a value function of the control policy using the lifted states. In such a manner, the controller determines a control input 162 to the machine using the lifted state and the updated control policy. Such a control input 162 can be used to drive an actuator 102 that changes 113 the motion and/or the state of the machine.

For example, during a current iteration, instead of the full state x, the whole control process is driven by the machine output y 165, which is obtained by the sensor 154 through sensing the machine. A receiver 155 transmits the output 165 to a differentiator 156, which generates a lifted state z: an instance of a lifted state space Z. The lifted state signal 161 is transferred to a controller which implements an output feedback control policy u(z) or a perturbed output feedback control policy $u_i(z,t)=u_i(z)+v(t)$ where v(t) is a perturbation signal. The output feedback control policy is defined over the lift state space Z. The controller determines 151 a control command $u_i(z(t))$ or $u_i(z(t),t)$ 161 based on an instance of the lifted state space at time t, denoted as z(t).

The actuator 102 generates physical quantities 113 as inputs of the machine 103. A processor 157 collects a sequence of lifted state $z(t_1), \ldots z(t_N)$ at various time instants $t_1, \ldots, t_N$ during a time interval $[t_1, t_N]$, and determines a new output feedback control policy $u_{i+1}(z)$, by resorting to a modified PI defined over the lifted state space. The modified PI iteratively solves a pseudo-HJB, where the pseudo-HJB is defined over the lifted state z. Once the new output feedback control policy is obtained, the updated control policy is pushed 116 to the controller 151 for real-time control after time $t_N$.

FIGS. 2A-2E show schematics of different implementations of functions of the differentiator according to some embodiments. For example, in one embodiment, the differentiator determines a first derivative of each of the measured state variable to produce the lifted state. This embodiment is simple in implementation and can be sufficient for forming the lifted state space. Additionally, or alternatively, in another embodiment, the differentiator determines a second derivative of each of the measured state variable to produce the lifted state. This embodiment provides for a stronger chance of forming onto mapping and is advantageous when a structure of the machine is not precisely known.

In general, however, in different embodiments, the differentiator determines time derivatives of each of the measured state variable up to an order resulting in the onto mapping from the lifted state space to the state space. For example, in some embodiments, the differentiator determines time derivatives of each of the measured state variable up to an order resulting in the lifted state space with dimensions greater than dimensions of the state space. This is because the dimensions of the lifted space should be equal or greater than the dimensions of the state space.

For example, when the controlled machine is an electric motor, the measured state variables are the current through the motor and the speed of the motor. The unmeasured state variable is a flux of the motor, which is difficult and/or expensive to measure. One embodiment, determines only first derivative of measured state variables, i.e., the derivatives of the current and the speed of the motor. The combination of the measured state variables and their derivatives result in the lifted state space with dimensions greater than dimensions of the state space. In addition, the structure of the electric motor indicates that such a lifted state space has an onto mapping to the state space of the motor. In such a manner, in some embodiments, the lifted state of the electric motor is formed by values of the current, the derivative of the current, the speed, and the derivative of the speed of the motor.

Figure 2A:
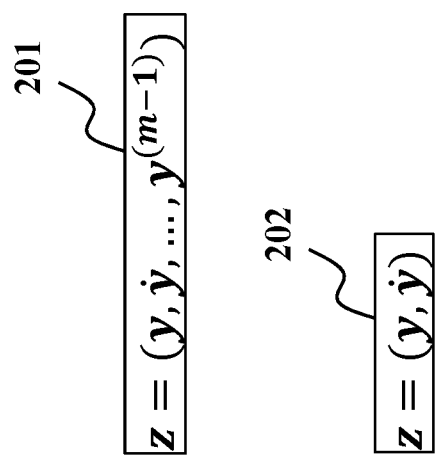

For example, as shown in FIG. 2A, the differentiator 156 differentiates y to a certain order m−1 to form the lifted state 201: $z=[y, \ldots, y^{(m)}]^T$ where $y^{(k)}$ for $2 \leq k \leq m-1$ denotes the kth order time derivative of y. The order m can be determined by utilizing structural knowledge about $f,g$ of the machine model and the dimension of the machine state x.

In some embodiments, structural knowledge of $f,g$ means that $f,g$ contain only parametric uncertainties, i.e., $f,g$ are known except the values of model parameters. In another embodiment, structure knowledge $f,g$ can be elaborated by the following example. The machine model is $$\dot{x}=f(x,u,\theta)$$

$$y=x_1,$$

where $x=[x_1, \ldots, x_n]^T$, $\theta$ is a vector of unknown parameters, and $$f(x)=[f_1(x_1,x_2,\theta), \ldots, f_n(x,u,\theta)]^T$$

In such a case, one embodiment differentiates y repetitively as follows $$\dot{y} = f_1(x_1, x_2, \theta)$$

$$\ddot{y} = \frac{\partial f_1}{\partial x_1} f_1 + \frac{\partial f_1}{\partial x_2} f_2(x_1, x_2, x_3, \theta)$$

$$\ldots$$

$$y^{(n-1)} = \varphi(x, \theta),$$

where $y^{(k)}$ represents the kth order time derivative of y. The k−1th order derivative introduces new information about $x_k$, and the n−1th order derivative contains information about $x_n$. In this embodiment, measured state variables y are differentiated at least n−1 times to ensure that z contains all information about x.

In the case that m=2, z is defined as 202

$$z=[y,\dot{y}]$$

The corresponding output feedback control policy takes the form of prevalent Proportional and Derivative (PD) control.

Another embodiment, shown in FIG. 2B, defines the lifted state space z to include integration of measured state variables y, which gives the lifted state z 211 as follows $$z=[y,\int_0^t y dt, \ldots, y^{(m)}]^T$$

When m=2, z is defined as 212

$$z=[y,\int_0^t y dt, \dot{y}]^T$$

The corresponding output feedback control policy approximates the form of prevalent Proportional, Integral, and Derivative (PID) control.

In another embodiment, the lifted state space includes the output and its time derivatives, and control and its time derivatives. Take an induction motor as an example. The motor model in a rotating frame d−q with an angular speed $\omega_1$ is given by $$i_{ds} = -\gamma i_{ds} + \omega_1 i_{qs} + \beta(\alpha \Phi_{dr} + \omega \Phi_{qr}) + \frac{u_{ds}}{\sigma} \quad (6)$$

$$i_{qs} = -\gamma i_{qs} - \omega_1 i_{ds} + \beta(\alpha \Phi_{qr} - \omega \Phi_{dr}) + \frac{u_{qs}}{\sigma}$$

$$\Phi_{ds} = -\alpha \Phi_{dr} + (\omega_1 - \omega) \Phi_{qr} + \alpha L_m i_{ds}$$

-continued $$\Phi_{qs} = -\alpha \Phi_{qr} - (\omega_1 - \omega) \Phi_{dr} + \alpha L_m i_{qs}$$

$$\dot{\omega} = \mu(\Phi_{dr} i_{qs} - \Phi_{qr} i_{ds}) - \frac{T_l}{J}$$

$$y = [i_{ds}, i_{qs}, \omega]^T$$

where y, representing measured signals, are currents of stator windings.

Definitions of notation are given in Table 1. At least portion of model parameters are unknown. Without loss of generality, denote the unknown parameters as θ.

TABLE 1

| Notations | |
|---|---|
| Notation | Description |
| $i_{ds}$, $i_{qs}$ | stator currents in d- and q-axis |
| $\Phi_{dr}$, $\Phi_{qr}$ | rotor fluxes in d- and q-axis |
| $u_{ds}$, $u_{qs}$ | stator voltages in d- and q-axis |
| ω | rotor angular speed |
| $\omega_1$ | angular speed of a rotating frame |
| $\Phi_r^*$ | rotor flux amplitude reference |
| $\omega^*$ | rotor angular speed reference |
| $i_{ds}^*$, $i_{qs}^*$ | references of stator currents in d- and q-axis |
| $T_l$ | load torque |
| J | inertia |
| $L_s$, $L_m$, $L_r$ | stator, mutual, and rotor inductances |
| $R_s$, $R_r$ | stator and rotor resistances |
| σ | $\frac{L_s L_r - L_m^2}{L_r}$ |
| α | $R_r/L_r$ |
| β | $L_m/(\sigma L_r)$ |
| γ | $R_s/\sigma + \alpha \beta L_m$ |
| μ | $3L_m/(2JL_r)$ |

Differentiating y once gives $$[y, \dot{y}] = [i_{ds}, i_{qs}, \omega, \dot{i}_{ds}, \dot{i}_{qs}, \dot{\omega}]^T \in R^6 =$$

$$\begin{bmatrix} i_{ds} \\ i_{qs} \\ \omega \\ -\gamma i_{ds} + \omega_1 i_{qs} + \beta(\alpha \Phi_{dr} + \omega \Phi_{qr}) + \frac{u_{ds}}{\sigma} \\ -\gamma i_{qs} - \omega_1 i_{ds} + \beta(\alpha \Phi_{qr} - \omega \Phi_{dr}) + \frac{u_{qs}}{\sigma} \\ \mu(\Phi_{dr} i_{qs} - \Phi_{qr} i_{ds}) - \frac{T_l}{J} \end{bmatrix}$$

Since u appears in $\dot{y}$, one need to augment the machine state by treating $u_{ds}$ and $u_{qs}$ as two augmented states $x_6=u_{ds}$, $x_7=u_{qs}$. This leads to an augmented motor model as follows $$i_{ds} = -\gamma i_{ds} + \omega_1 i_{qs} + \beta(\alpha \Phi_{dr} + \omega \Phi_{qr}) + \frac{x_6}{\sigma} \quad (7)$$

$$i_{qs} = -\gamma i_{qs} - \omega_1 i_{ds} + \beta(\alpha \Phi_{qr} - \omega \Phi_{dr}) + \frac{x_7}{\sigma}$$

$$\Phi_{ds} = \alpha \Phi_{dr} + (\omega_1 - \omega) \Phi_{qr} + \alpha L_m i_{ds}$$

$$\Phi_{qs} = -\alpha \Phi_{qr} - (\omega_1 - \omega) \Phi_{dr} + \alpha L_m i_{qs}$$

$$\dot{\omega} = \mu(\Phi_{dr} i_{qs} - \Phi_{qr} i_{ds}) - \frac{T_l}{J}$$

-continued $$\dot{x}_6 = v_d$$
$$\dot{x}_7 = v_q$$
$$y = [i_{ds}, i_{qs}, \omega, x_6, x_7]^T$$

where $v_d$, $v_q$ are new control inputs, and $y_a$ is an augmented output including control and its time derivatives. Then, one can differentiate the original output $i_{ds}$, $i_{qs}$, $\omega$ and have $$z(x, \theta) = [i_{ds}, i_{qs}, \omega, \dot{i}_{ds}, \dot{i}_{qs}, \dot{\omega},$$

$$x_6, x_7] = \begin{bmatrix} i_{ds} \\ i_{qs} \\ \omega \\ -\gamma i_{ds} + \omega_1 i_{qs} + \beta(\alpha \Phi_{dr} + \omega \Phi_{qr}) + \frac{x_6}{\sigma} \\ -\gamma i_{qs} - \omega_1 i_{ds} + \beta(\alpha \Phi_{qr} - \omega \Phi_{dr}) + \frac{x_7}{\sigma} \\ \mu(\Phi_{dr} i_{qs} - \Phi_{qr} i_{ds}) - \frac{T_l}{J} \\ x_6 \\ x_7 \end{bmatrix} \in \mathbb{R}^8.$$

z is 8-dimension, and it clearly contains more information than x, i.e., $x=P_z(z,\theta)$ is onto. Meanwhile, one can verify that given an instance z, then an instance x of the state space is uniquely determined for almost all $\theta$. Therefore, $z \in \mathbb{R}^8$ is the lifted state.

Figure 2C:
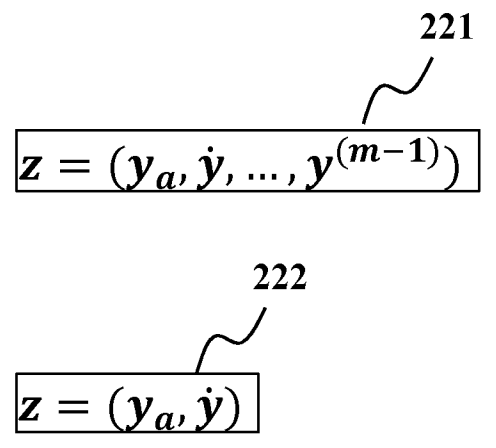

FIG. 2C shows another embodiment of determining the lifted state space z suitable for the motor example. This embodiment defines the lifted state z as a combination of the augmented output $y_a$, and time derivatives of y up to order m−1. That is the lifted state z 221 is given by $$z=[y_a, \dot{y}, \ldots, y^{(m-1)}]^T.$$

When m=2, the lifted state 222 is:

$$z=[y_a, \dot{y}]^T.$$

With the lifted state 222, a corresponding output feedback control policy generalizes the well-known PD control policy.

Figure 2D:
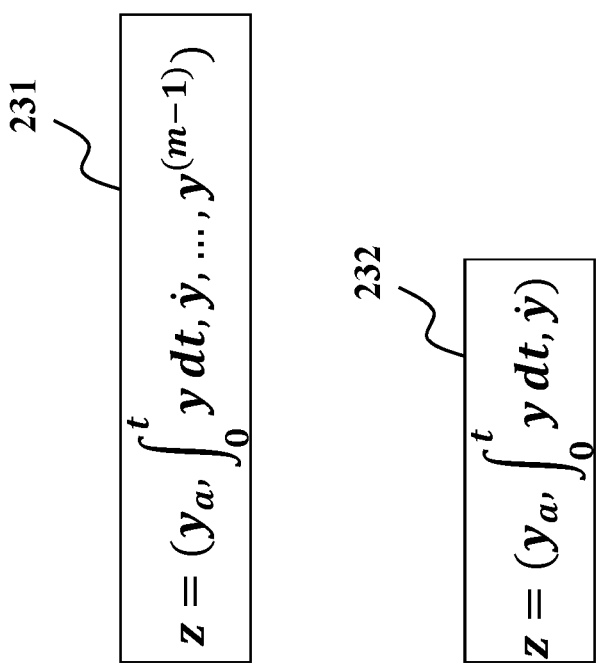

Another embodiment shown in FIG. 2D defines the lifted state z as a combination of the augmented output $y_a$, integration of y, and time derivatives of y up to order $y^{(m-1)}$. The lifted state 231 is given by $$z=[y_a, \int_0^t y\,dt, \ldots, y^{(m-1)}]^T.$$

When m=2, the lifted state 232 is given by $$Z=[y_a, \int_0^t y\,dt, \dot{y}]^T.$$

With the lifted state 232, a corresponding output feedback control policy generalizes the well-known PID control policy.

As exposed in the induction motor case, the original machine state may need to be augmented, if time derivatives of y are functions of u and its derivatives. Because u and its time derivatives are accessible, they, together with the machine state x, form augmented state $x_a$. Additionally, they are augmented to the output y to form augmented output $y_a$. As a result, the lifted state space contains the augmented outputs $y_a$, and time derivatives of the output y.

In some situations, control designers may not have enough information of $f,g$ to determine the needed order of time derivatives of y. To that end, there is a need to differentiate y sufficiently such that $n_z > n_x$ if $n_x$ is available.

Figure 2E:
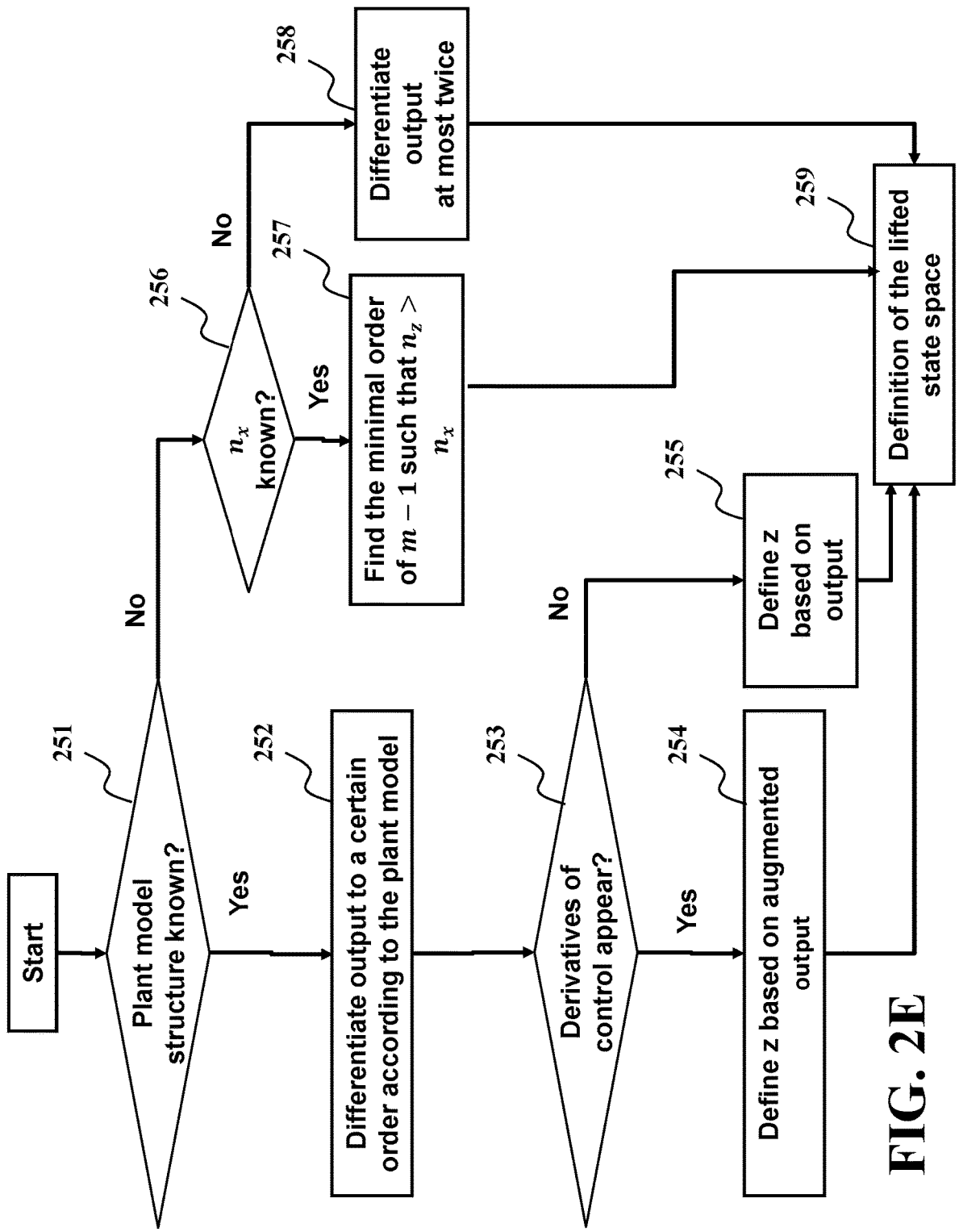
FIG. 2E shows a flowchart of a method for determining the lifted state for a controlled machine according to some embodiments.

FIG. 2E shows a flowchart of a method for determining the lifted state for a controlled machine according to some embodiments. For example, one embodiment uses a machine model containing uncertainties. If the model structure is known, one embodiment can differentiate 252 output up to find the minimal m−1 order such that x can be uniquely determined by the knowledge of y, $\dot{y}$, ..., $y^{(m-1)}$. If the output derivatives have control u and its time derivatives as arguments, some implementations construct 255 the augmented output $y_a$, and define 255 the lifted state on the basis of the augmented output. If the control and its time derivatives do not appear in y, $\dot{y}$, ..., $y^{(m-1)}$, then define 255 the lifted state based on y.

In another embodiment, the model structure 251 is unknown, and the embodiment determines 256 whether the dimension of the state can be approximately established through control input and output. If $n_x$ is known, then the embodiment finds the minimal order m−1 such that dimension of $[y, \ldots, y^{(m-1)}]$ is greater than $n_x$; otherwise, one chooses $2 \le m \le 3$. Working through various embodiments of the flowchart ends up with a definition of the lifted state space 259.

In one embodiment, an output feedback control policy $u(z) \in U_z \subset C^1[0,T]$ with $z=[y, \dot{y}, \ldots, y^{(m-1)}] \in \mathbb{R}^{n_z}$. $u(Z)$ is admissible if, for any initial condition $x_0 \in \Omega_x$, the resultant closed-loop system is stable. Correspondingly, $U_z$ is called the admissible output feedback control set. Defining $U_z$ as the set of all admissible output feedback control policies, some implementations assume that $U_z$ is non-empty. The data-driven output feedback optimal control problem for machine (1) can be formulated as: Given a machine (1) without knowing $f,g$, find $u^*(z) \in U_z$ which minimizes the cost function (2), i.e.

$$u^*(z^*) = \arg\min_{u(z) \in U_z} J(u(z)).$$

Different from the state feedback case where (4)-(5) during PI are parameterized (defined) over x, we need to re-parameterize (4)-(5) over z to perform the data-driven output feedback control synthesis.

FIG. 3 shows a general block diagram of a method for constructing a data-driven output feedback optimal control policy for a machine without knowing its dynamics and state according to some embodiments. With the definition of the lifted state space 259, a pseudo-HJB defined over the lifted state space is first determined 301, and then solved 302 for its approximate solution. In such a manner, the processor updates the control policy using an adaptive dynamic programming (ADP) without using dynamics and the state of the machine. In various embodiments, the ADP determines 302 an approximate solution of Hamilton-Jacobi-Bellman (HJB) equations parameterized 301 over the lifted state space.

Figure 4A:
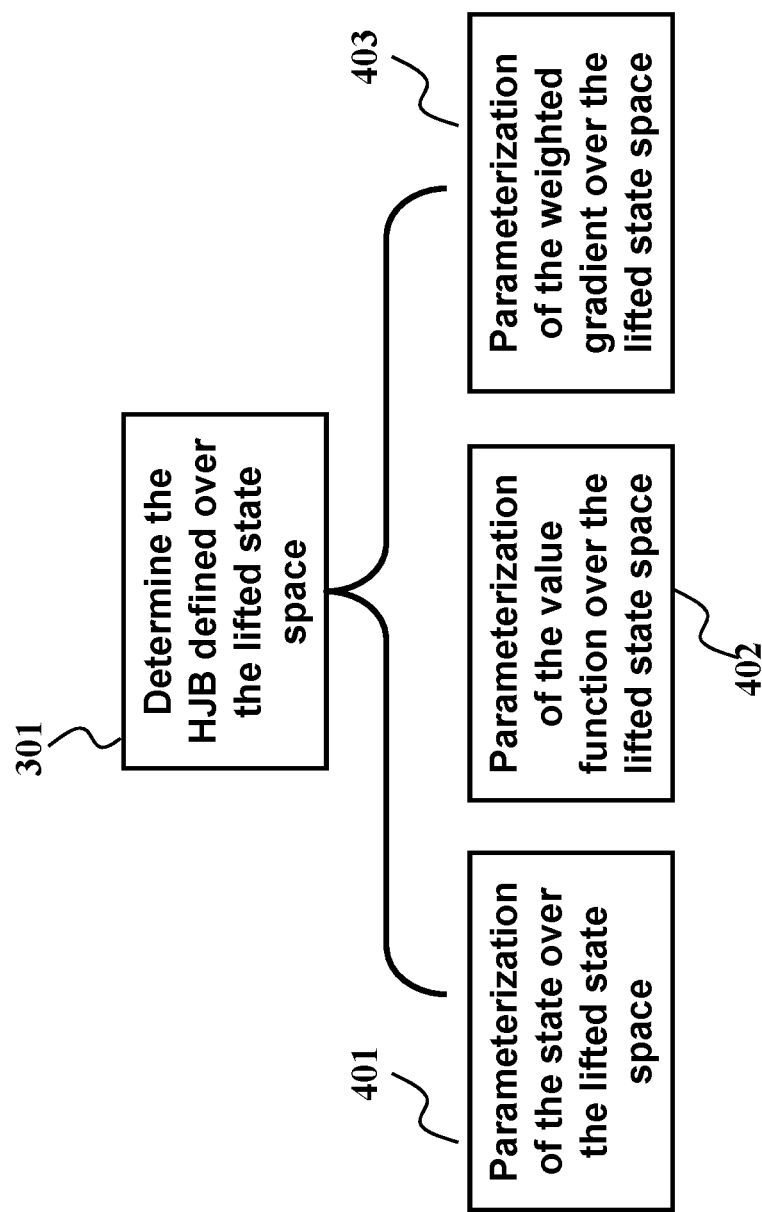
FIG. 4A shows a schematic of the parameterization of the HJB equations over the lifted state space according to some embodiments.

FIG. 4A shows a schematic of the parameterization of the HJB equations over the lifted state space according to some embodiments. In some implementations, the parametrization 301 includes parameterization 401 of the state space over the lifted state space, parameterization 402 of the value function over the lifted state space and parameterization 403 of a weighted gradient of the control policy over the lifted state space.

For example, some implementations derive 401 a parameterization of a state x over the lifted state space, i.e., representing x as a function of z wherein the function x=ϕ(z) includes unknown parameters. Next, the implantations derive 402 a parameterization of a value function V(x) result from an admissible output control policy u(z) over the lifted state space, i.e., representing V(x) as a function of z wherein the function $V_z(z)$ includes unknown parameters, and derive 403 a parameterization of a weighed gradient ∇V(x)g(x) over the lifted state space, i.e., representing ∇V(x)g(x) as a function of z, denoted by a function W(z).

Because dynamics $f,g$ are unknown or partially unknown, the exact representation ϕ(z) is difficult to obtain. So do $V_z(z)$ and W(z). This means ϕ(z), $V_z(z)$, and W(z) belong to an infinite dimensional functional space $C^0$ containing all continuous functions of z.

Figure 4B:
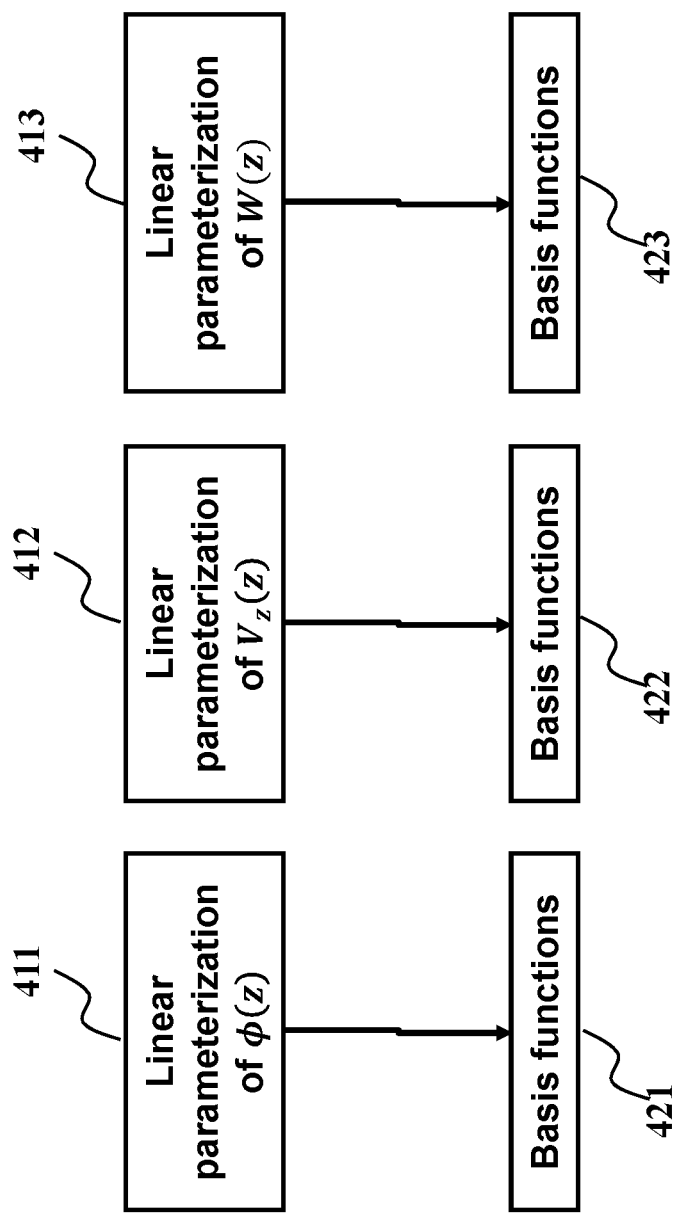
FIG. 4B shows a schematic of parameterization over lifted state space according to one embodiment.

FIG. 4B shows a schematic of parameterization over lifted state space according to one embodiment. This embodiment determines linear parameterizations 411, 412, 413 of ϕ(z), $V_z(z)$, and W(z) over the functional space, for instance, $$\phi(z) = \overline{\Theta}^x \Phi^x(z)$$

$$V_z(z) = \overline{\Theta}^V \Phi^V(z)$$

$$W(z) = \overline{\Theta}^{Vg} \Phi^{Vg}(z),$$

where $\overline{\Theta}^x$, $\overline{\Theta}^{Vg}$, $\overline{\Theta}^V$ are unknown parameters (also named after coefficients), and $\Phi^x(z)$, $\overline{\Phi}^V(z)$, $\overline{\Phi}^{Vg}(z)$ are smooth basis functions of ϕ(z), $V_z(z)$, W(z) respectively. Linear parameterizations 411, 412, 413 are essentially reduced to choose appropriate basis functions 421, 422, 423 for the state ϕ(z), the value function $V_z(z)$, and the weighted gradient W(z), respectively. In one implementation, basis functions of ϕ(z), $V_z(z)$ and W(z) are chosen as polynomial functions for computational efficiency.

With aforementioned linear parameterizations, one embodiment can determine a form of the pseudo-HJB, which are defined over the lifted state space. The newly obtained pseudo-HJB comprise of unknown parameters (coefficients of the value function and the weighted gradient) and the known lifted state z. Linear parameterizations permit us to reduce the newly pseudo-HJB (4) to a system of linear equations, given the machine output at multiple time instants.

Figure 5A:
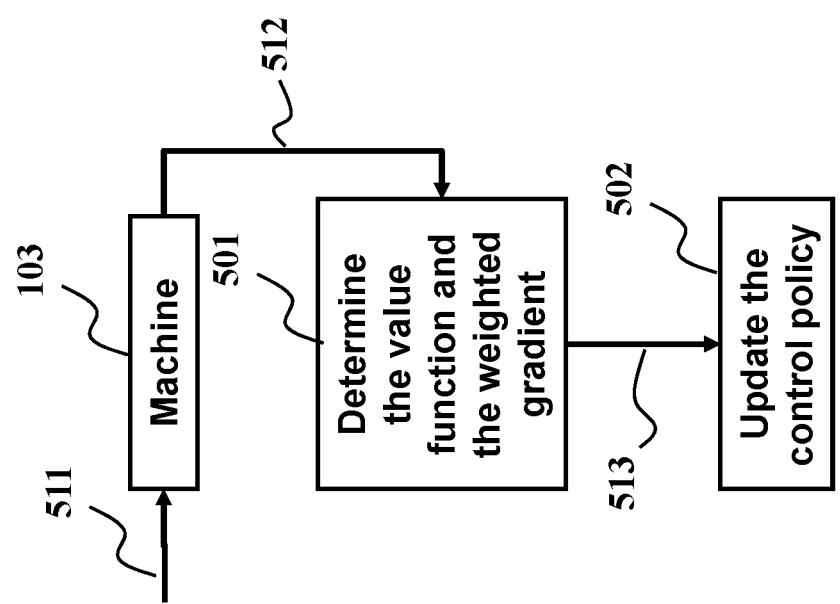
FIG. 5A shows a block diagram of a method for determining an approximate solution of the pseudo-HJB defined over the lifted state space according to one embodiment.

FIG. 5A shows a block diagram of a method for determining 302 an approximate solution of the pseudo-HJB defined over the lifted state space according to one embodiment. At each iteration, control command 511, according to an output feedback control policy u(z) (interchangeably used as K(z) in the sequel) and a perturbation signal v(t), is applied to the machine 103; the machine output 512 at multiple time instants is used to determine 501 the value function and the weighted gradient corresponding to the control command. Finally, unknown parameters (coefficients) of the value function and the weighted gradient are determined 501. The determined parameters of the weighted gradient 513 are used to update 502 the output feedback control policy for next iteration $$K_{i+1}(z) = -\frac{1}{2} R^{-1} \Theta_i^{Vg} \Phi^{Vg}(z).$$

Figure 5B:
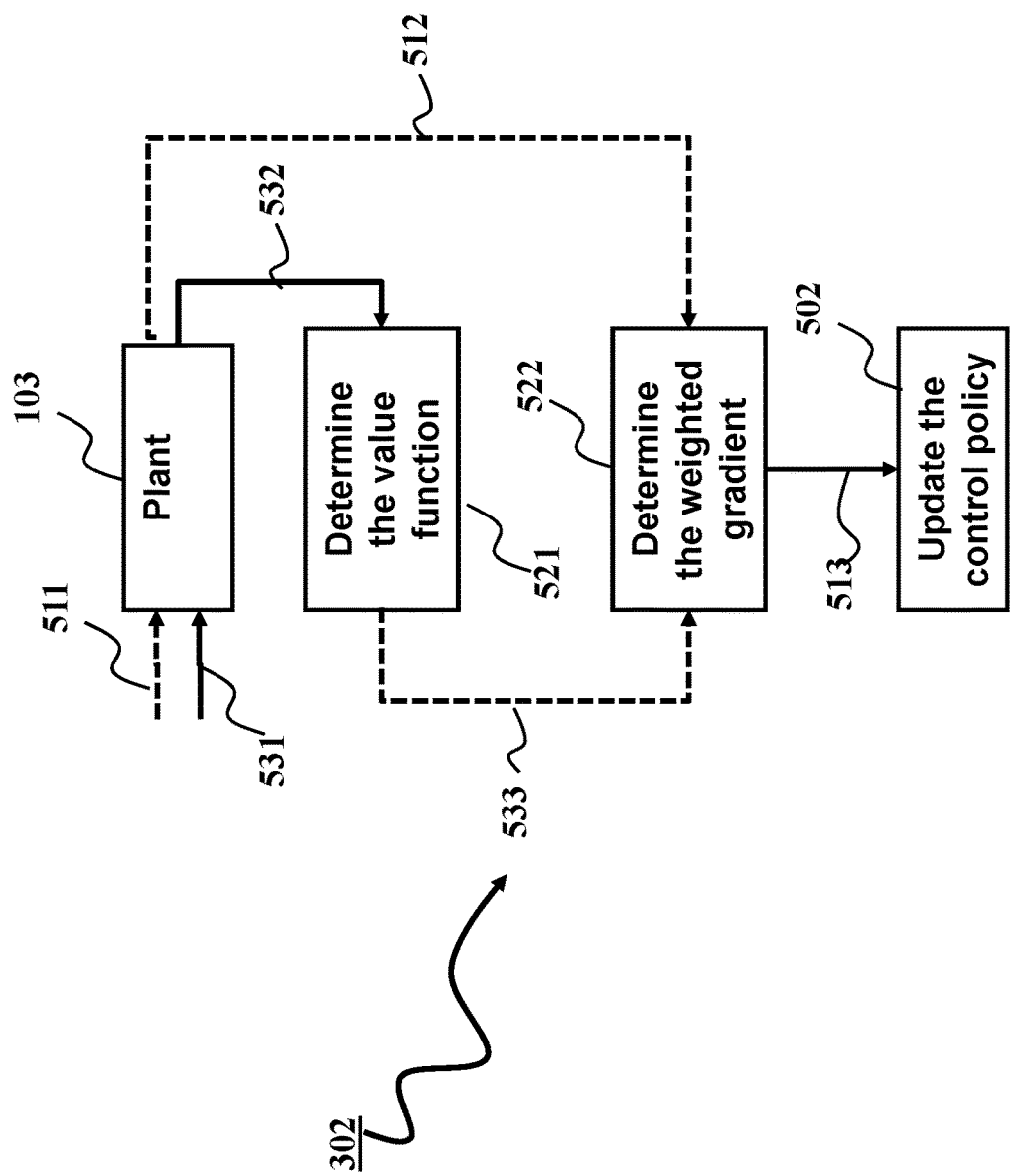
FIG. 5B shows a block diagram of a method for determining an approximate solution of the pseudo-HJB defined over the lifted state space according to another embodiment.

FIG. 5B shows a block diagram of a method for determining 302 an approximate solution of the pseudo-HJB defined over the lifted state space according to another embodiment. At each iteration, control command 531, according to an output control policy u(z), is applied to the machine 103; the machine output 532 at multiple time instants is used to determine 521 the coefficients of the value function corresponding to the control policy u(z). The determination 521 produces values of coefficients in the value function, e.g. $\overline{\Theta}^V$. Secondly, control command 511, based on the output control policy u(z) and a perturbation signal v(t), is applied to the machine 103; the machine output 512 at multiple time instants and the values 533 of coefficients in the value function are used to determine 522 the coefficients of the weighted gradient. Finally, parameters of the weighted gradient are used to update 502 the output control policy for next iteration.

Figure 5C:
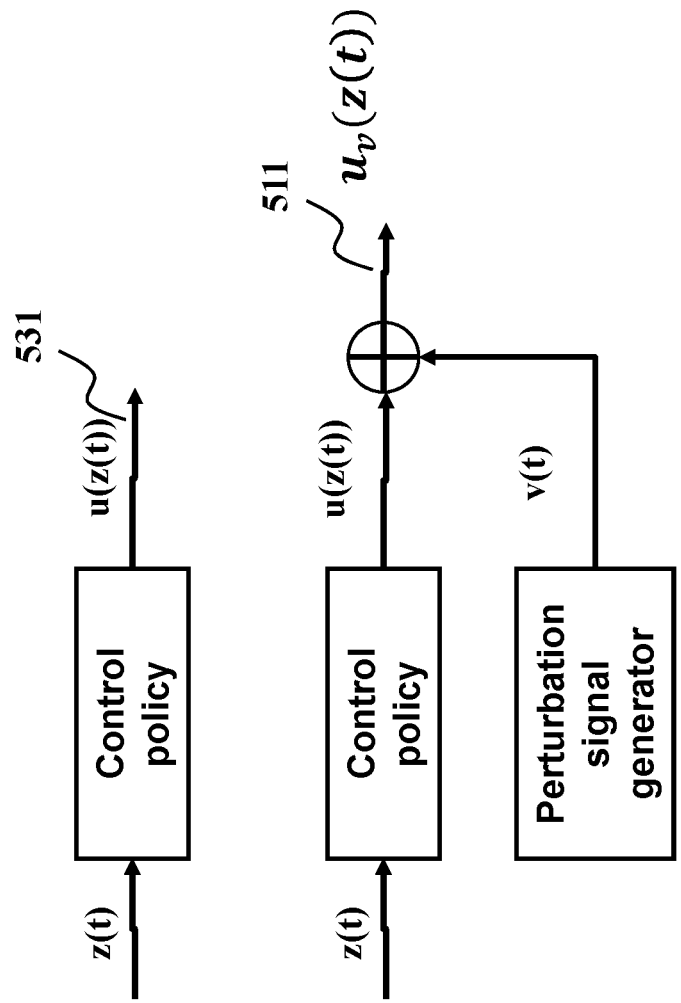
FIG. 5C shows a schematic of a method that determines the weighted gradient for the control policy perturbed with a perturbation signal according to one embodiment.

FIG. 5C shows a schematic of a method that determines the weighted gradient for the control policy perturbed with a perturbation signal according to one embodiment. This embodiment constructs the control commands 531 and 511 according to the lifted state z(t) at time instant t, and a perturbation signal v(t). In some embodiments, v(t) is generated according to a random variable with its expected value being smaller than the amplitude of u(z(t)

$$K_{i+1}(z) = -\frac{1}{2} R^{-1} \Theta_i^{Vg} \Phi^{Vg}(z).$$

Figure 6A:
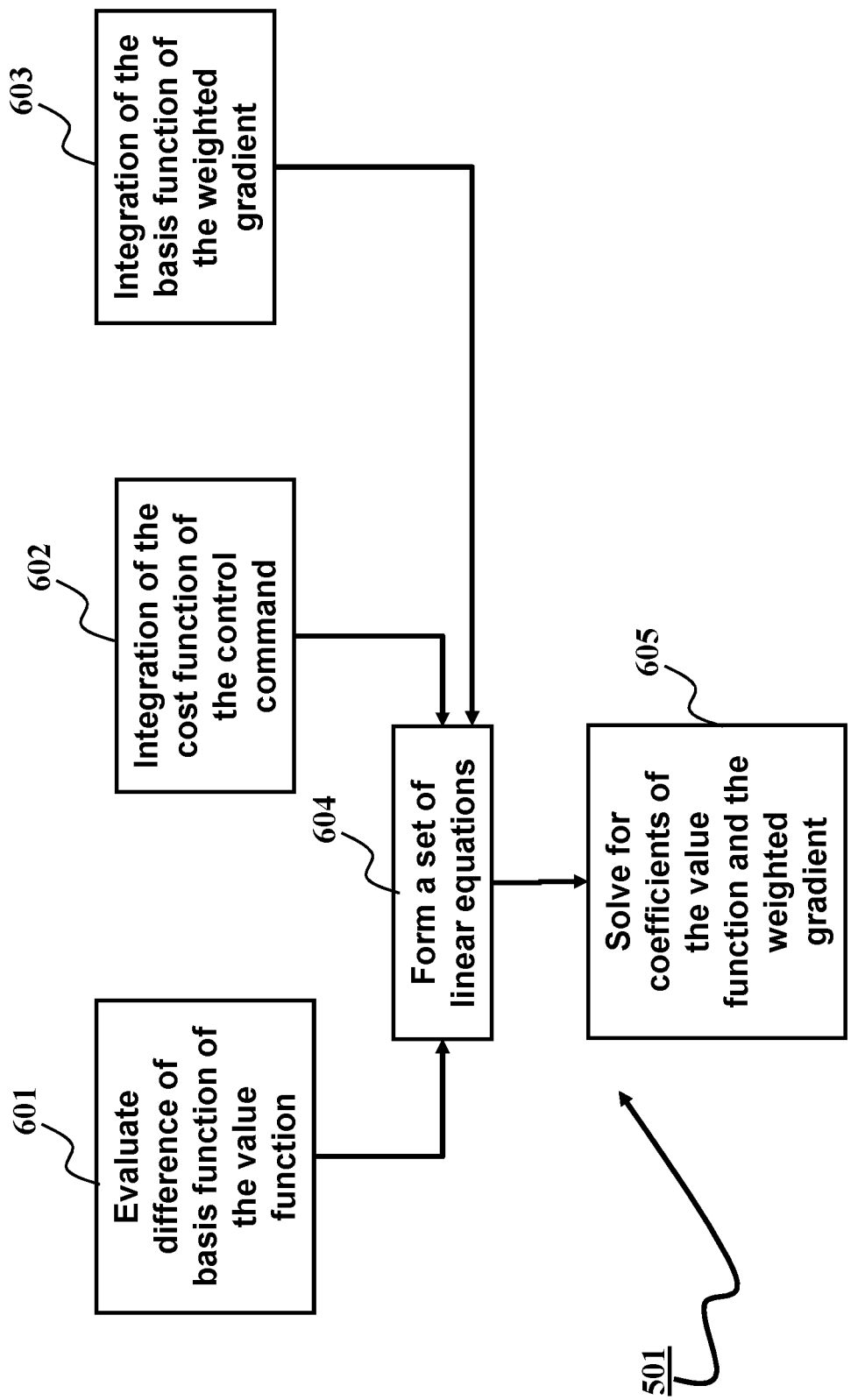
FIG. 6A shows a block diagram of a method for determining coefficients of the value function and the weighted gradient according to one embodiment.

FIG. 6A shows a block diagram of a method for determining 501 coefficients of the value function and the weighted gradient according to one embodiment. For example, the machine (1) is subject to control command $$\underbrace{u(z, t) = -\frac{1}{2} R^{-1} \overline{\Theta}^{Vg} \overline{\Phi}^{Vg}(z)}_{u(z)=K(z)} + v(t),$$

where v(t)∈$R^m$. The resultant closed-loop system is $$\dot{x} = f(x) + g(x)u(z) + g(x)v(t). \quad (8)$$

The embodiment determines 501 the value function $V_z(z)$ and the weighted gradient ∇Vg from output trajectories of the closed-loop system (8). Along the trajectory of the closed-loop system (8), the change of V during the time interval [t, t+δ] is given by $$dV(t) = V(x(t+\delta)) - V(x(t)) = \overline{\Theta}^V \{\overline{\Phi}^V(z(t+\delta)) - \overline{\Phi}^V(z(t))\} = \int_t^{t+\delta} (\nabla V(x)(f(x) + g(x)K(z) + g(x)v(t)))dt$$

With two instances of the lifted states z at time instants t and t+δ, a difference of basis functions of the value function, denoted by $\Delta\Phi^V(t)$, is evaluated 401 as follows $$\Delta\Phi^V(t) = \overline{\Phi}^V(z(t)) - \overline{\Phi}^V(z(t+\delta)).$$

The cost function of the control policy u(z) is integrated 602 over [t,t+δ], i.e., $$\rho(t) = \int_t^{t+\delta} (y^T Q y + (u(z))^T R u(z)) dt.$$

The basis functions of the weight gradient are integrated 603 over [t,t+δ], i.e., $$\psi(t) = \int_t^{t+\delta} \overline{\Phi}^{Vg}(z) v(t) dt.$$

The pseudo-HJB during [t,t+δ] is reduced to a linear equation $$\overline{\Theta}\Psi(t) = \rho(t),$$

where $\bar{\Theta}=[\bar{\Theta}^V, \bar{\Theta}^{Vg}] \in \mathbb{R}^{N+q}$, and $$\Psi(t) = \begin{bmatrix} \Delta\Phi^V \\ \psi(t) \end{bmatrix}$$

By aggregating output during intervals $[t, t+\delta,], [t+\delta, t+2\delta], \ldots, [t+(M_j-1)\delta, t+M_j\delta]$ with $N+q \leq M_j < \infty$, a system of linear equations can be formed 604 as follows $$\bar{\Theta}\Psi = \rho, \quad (9)$$

where $\Psi=[\Psi(t), \Psi(t+\delta), \ldots, \Psi(t+M_j\delta)]$ and $\rho=[\rho(t), \rho(t+\delta), \ldots, \rho(t+M_j\delta)]$. As long as $\Psi\Psi^T$ is non-singular, $\bar{\Theta}$ is uniquely determined 605 as $\bar{\Theta}=\rho\Psi^T(\Psi\Psi^T)^{-1}$.

FIG. 6B shows a pseudo code of one exemplar implementation of an embodiment of FIG. 6A. This implementation determines $\bar{\Theta}^V$ and $\bar{\Theta}^{Vg}$ jointly. In the pseudo code of FIG. 6B, i is the index for PI, $M_i$ is the maximum number of iterations, j tracks episodes of measurements to form well-conditioned linear equations (9), and $M_j$ indicates the maximum number of episodes.

Figure 7A:
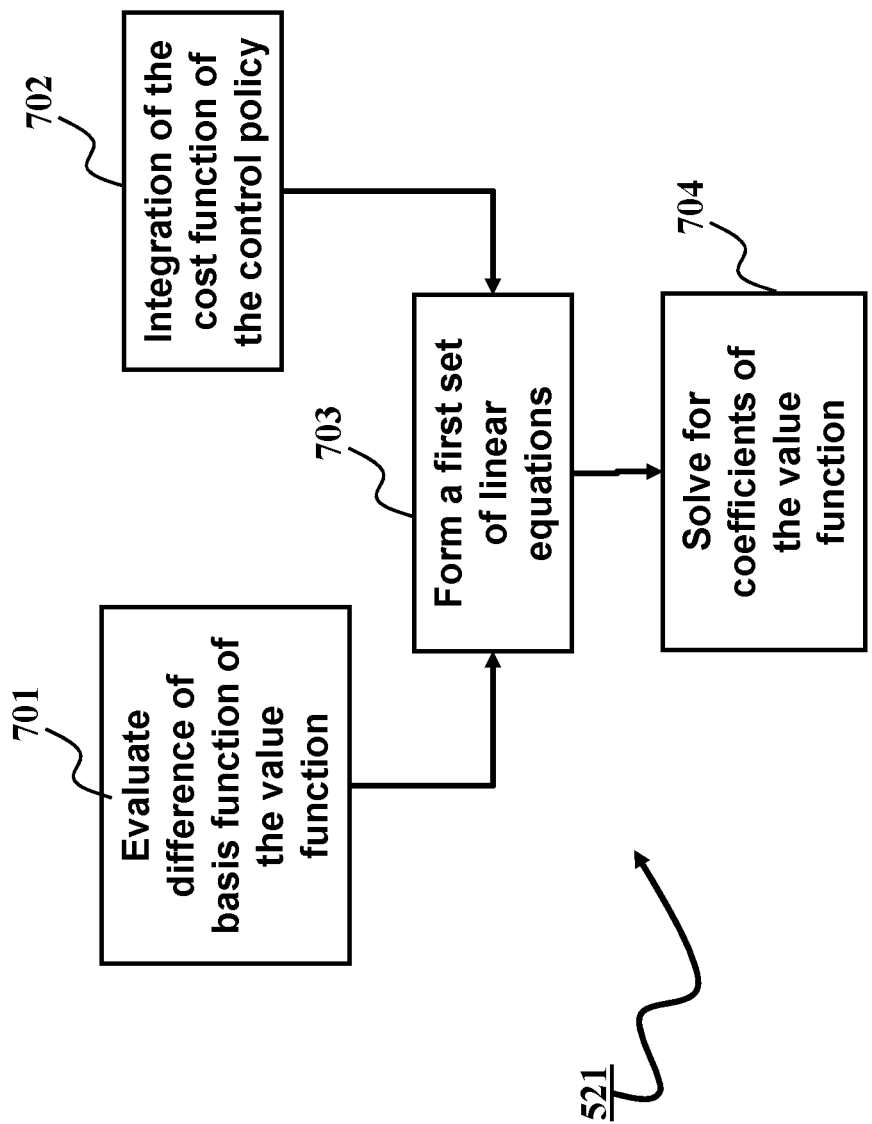
FIG. 7A shows a block diagram of a method for determining the coefficients of the value function corresponding to the control policy according to one embodiment.

FIG. 7A shows a block diagram of a method for determining 521 the coefficients of the value function corresponding to the control policy according to one embodiment. This embodiment improves numerical stability of the control policy update. The embodiment determines $V_z(z)$ through output trajectories of the closed-loop system $$\dot{x} = f(x) = g(x)u(z) \quad (10)$$

From output trajectories of the closed-loop system (10), a difference of basis functions of the value function $\Delta\Phi^V(t)$ is evaluated 701 as follows $\Delta\Phi^V(t) = \bar{\Phi}^V(z(t)) - \bar{\Phi}^V(z(t+\delta))$.

The cost function of the control policy $u(z)$ is integrated 702 over $[t, t+\delta]$, i.e., $$\rho(t) = \int_t^{t+\delta}(y^TQy+(u(z))^TRu(z))dt.$$

The pseudo-HJB during $[t, t+\delta]$ is reduced to a linear equation $$\bar{\Theta}_i^V \Delta\Phi^V(t) = \rho(t). \quad (11)$$

With a sequence of lifted states at $t, t+\delta, \ldots, t+M_j\delta$, a set of linear equations can be formed 703 and solved 704 for the coefficients $\bar{\Theta}_i^V$. Then coefficients of the weighted gradient $\Delta Vg$ are worked out by utilizing output trajectories of the closed-loop system (8), and the knowledge of $\bar{\Theta}_i^V$ determined in 704.

Figure 7B:
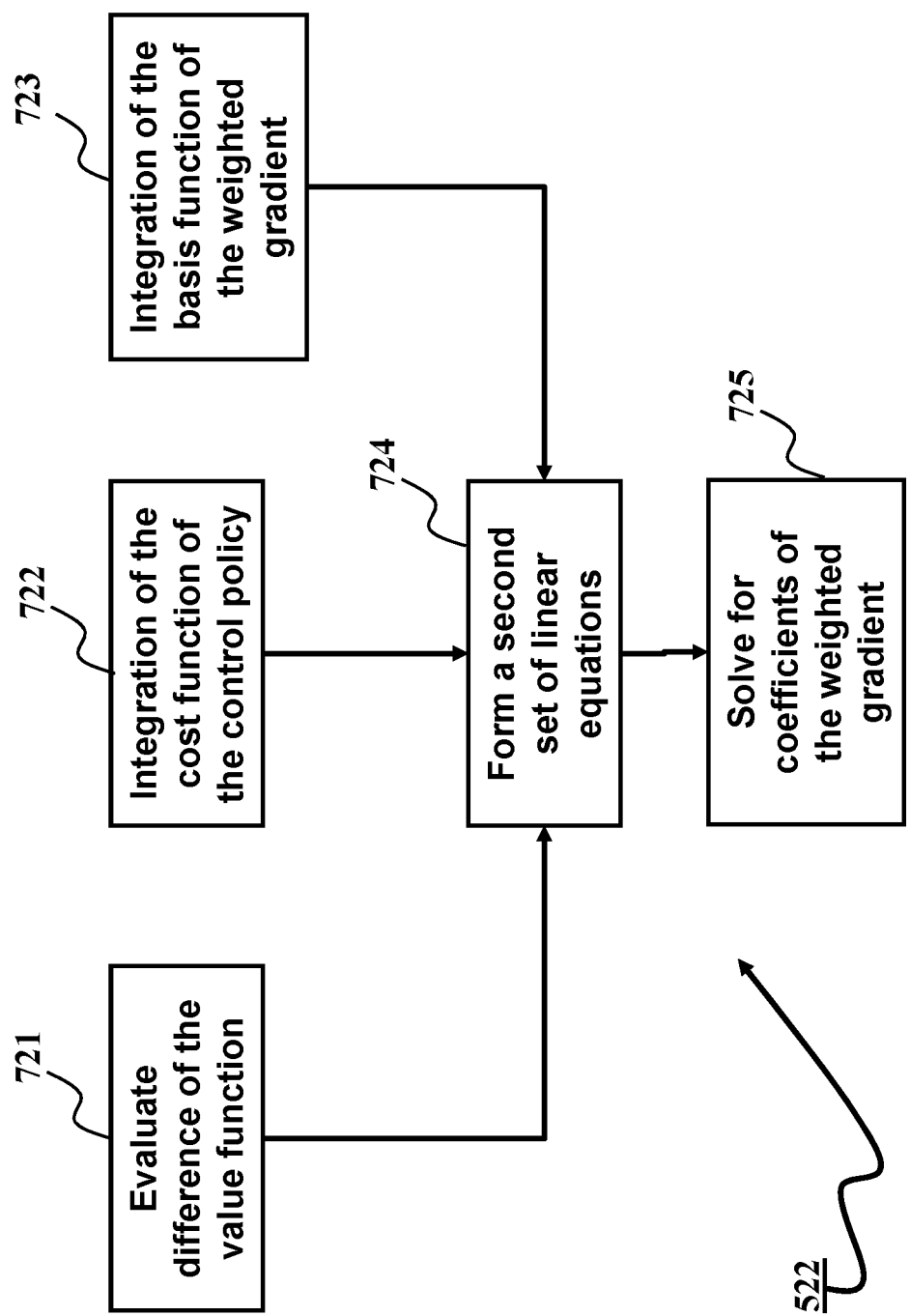
FIG. 7B shows a block diagram of a method for determining the coefficients of the weighted gradient according to one embodiment.

FIG. 7B shows a block diagram of a method for determining 522 the coefficients of the weighted gradient according to one embodiment. As shown in FIG. 7B, the difference of the value function at time instants $t$ and $t+\delta$ can be evaluated 721, given $z(t)$ and $z(t+\delta)$, i.e., $$\Delta V_z(z(t)) = \bar{\Theta}_i^V \Delta\Phi^V(t).$$

The cost function of the control policy $u(z)$ is integrated 722 over $[t, t+\delta]$, i.e., $$\rho(t) = \int_t^{t+\delta}(y^TQy+(u(z))^TRu(z))dt.$$

The basis functions of the weight gradient are integrated 723 over $[t, t+\delta]$, i.e., $$\psi(t) = \int_t^{t+\delta}\bar{\Phi}^{Vg}(z)v(t)dt.$$

The pseudo-HJB during $[t, t+\delta]$ is reduced to a linear equation $$\bar{\Theta}_i^{Vg}\Psi^{Vg}(t) = \rho(t) - \bar{\Theta}_i^V \Delta\Phi^V(t), \quad (12)$$

With a sequence of lifted states at $t, t+\delta, \ldots, t+M_j\delta$, a set of linear equations can be formed 724 and solved 725 for the coefficients $\bar{\Theta}_i^{Vg}$.

Figure 7C:
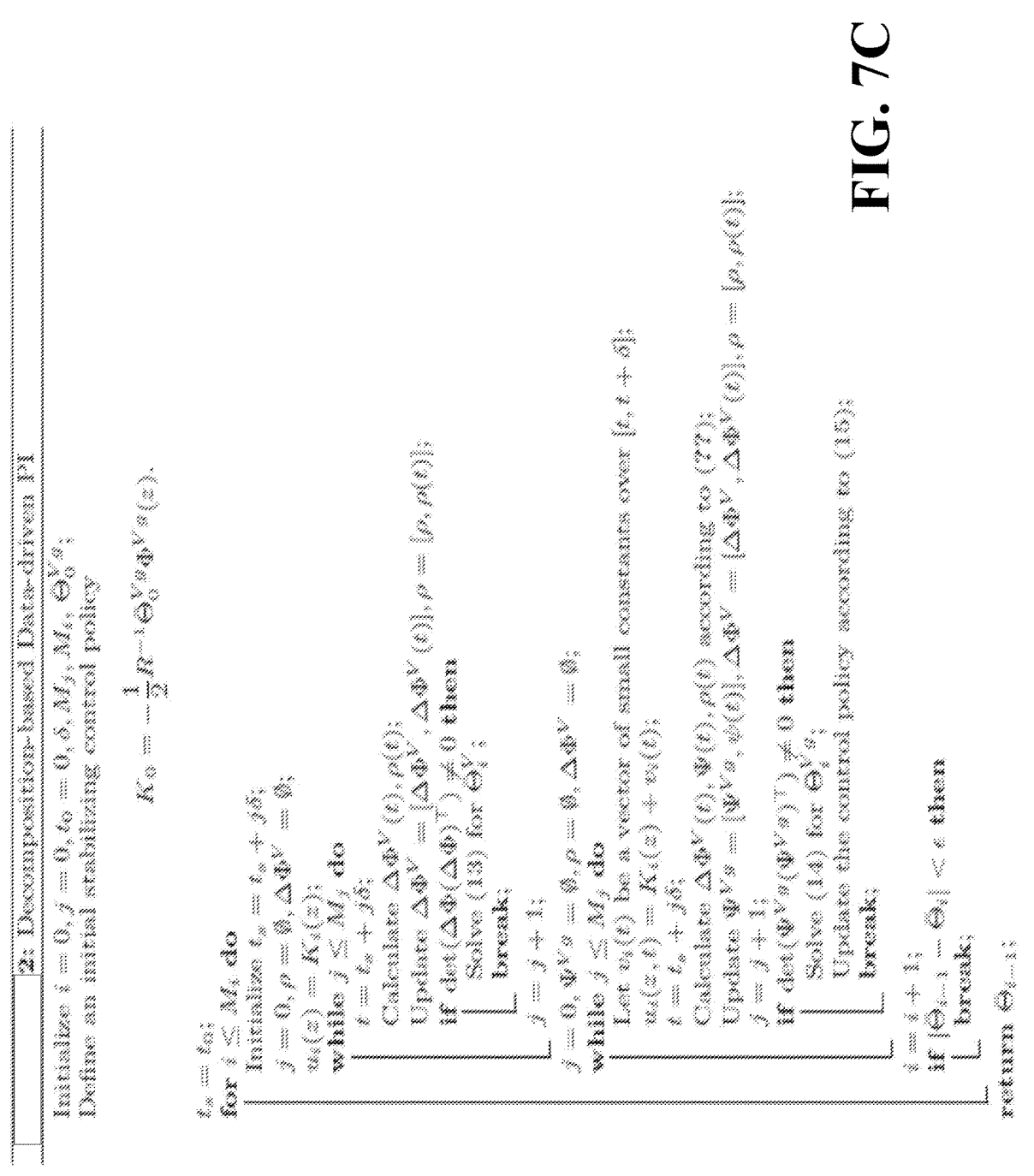

FIG. 7C shows a pseudo code of one exemplar implementation of embodiments of FIGS. 7A and/or 7B. This implementation splits data-driven PI into three steps: for $i=0, 1, \ldots$.

1. Policy evaluation: apply $u_i(z) = K_i(z)$ and measure the output of machine (10) to construct linear equations $$\bar{\Theta}_i^V \Delta\Phi^V = \rho, \quad (13)$$

where $\Delta\Phi^V = [\Delta\Phi^V, \Delta\Phi^V(t)]$, $\rho = [\rho, \rho(t)]$; solve (13) for $\bar{\Theta}_i^V$;

2. Gradient determination: resolve $\bar{\Theta}_i^{Vg}$ by forming and solving the following linear equations $$\bar{\Theta}_i^{Vg}\Psi^{Vg} = \rho - \bar{\Theta}_i^V \Delta\Phi^V, \quad (14)$$

where $\Psi^{Vg} = [\psi(t), \ldots, \psi(t+M_j\delta)]$ and $\Delta\Phi^V = [\Delta\Phi^V(t), \ldots, \Delta\Phi^V(t+M_j\delta)]$ are generated by output of the machine (8);

3. Policy improvement: update the control policy 502:

$$K_{i+1}(z) = -\frac{1}{2}R^{-1}\Theta_i^{Vg}\Phi^{Vg}(z). \quad (15)$$

Figure 8:
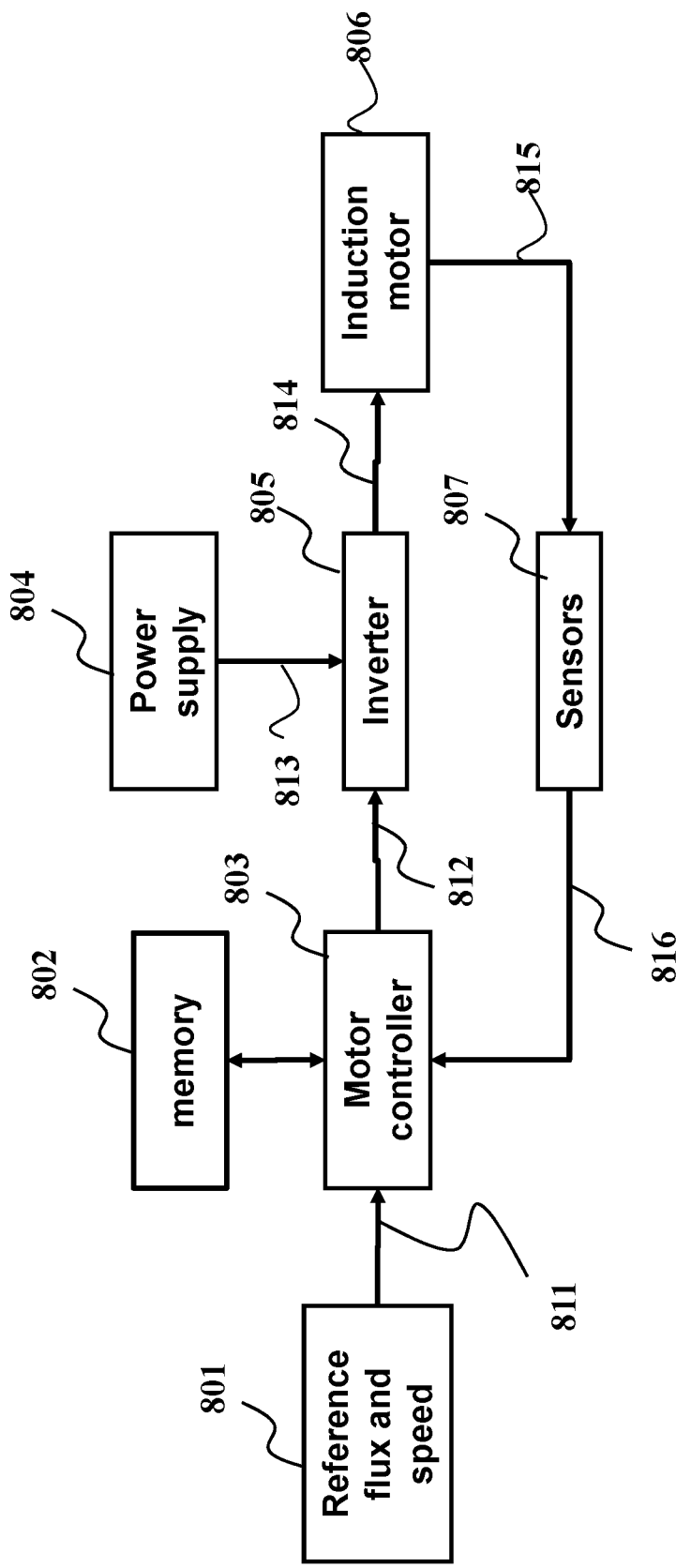
FIG. 8 shows a block diagram of a control system for controlling a motor according to one embodiment.

FIG. 8 shows a block diagram of a control system for controlling a motor according to one embodiment. A controller 803 starts with an initial stabilizing output feedback control policy, obtains an output feedback optimal control policy through a process employed by various embodiments. Reference flux and speed 811 is generated in 801 and sent over to motor controller 803. The motor controller retrieves executable code from memory 802 and determines a lifted state at every sample time according to the motor output 816; produces a control command according to a control policy over the lifted state space; solves an approximate solution of the pseudo-HJB based on a sequence of the motor output 816 at multiple time instants (output trajectories); and updates the control policy. Motor controller outputs a control command, representing preferred three-phase AC voltage in one embodiment, to an inverter 805, which subsequently generates three-phase voltages to the induction motor 806. The motor operation status is sensed by sensors 807. In one embodiment, the output 816 includes current in the stator winding, and rotor speed. Definition of the lifted state space is also disclosed above.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

The invention claimed is:

1. A control system for controlling a machine, comprising:
a controller to control a machine according to a control policy parameterized on a lifted state space of the machine having an unknown onto mapping to a state space of the machine, wherein a state of the machine is an instance in the state space that uniquely defines the machine at a time instance, wherein a lifted state of the machine is an instance in the lifted state space that defines the machine at the time instance, such that the lifted state at the time instance has the unknown onto mapping to the state of the machine at the time instance;
a receiver to accept a sequence of measurements of state variables measured over a sequence of time instances, the state variables measured for the time instance form a portion of the state of the machine at the time instance;
a differentiator to determine, for the time instance, a derivative of at least one measured state variable using values of the state variable measured for multiple time instances, wherein a combination of the measured state variables and the derivative of the at least one measured state variable defines the lifted state for the time instance; and
a processor to update the control policy by evaluating a value function of the control policy using the lifted states, such that the controller determines a control input to the machine using the lifted state and the updated control policy.

2. The control system of claim 1, wherein the controlled machine is an electric motor, the state of the electric motor includes a current through the motor, a speed of a rotor of the motor, and a flux of the motor, wherein the measured state variables are the current and the speed of the motor, wherein the lifted state of the electric motor is formed by values of the current, the derivative of the current, the speed, and the derivative of the speed of the motor.

3. The control system of claim 1, wherein the differentiator determines a first derivative of each of the measured state variable to produce the lifted state.

4. The control system of claim 3, wherein the differentiator determines a second derivative of each of the measured state variable to produce the lifted state.

5. The control system of claim 1, wherein the differentiator determines time derivatives of each of the measured state variable up to an order resulting in the onto mapping from the lifted state space to the state space.

6. The control system of claim 1, wherein the differentiator determines time derivatives of each of the measured state variable up to an order resulting in the lifted state space with dimensions greater than dimensions of the state space.

7. The control system of claim 1, wherein the processor updates the control policy using an adaptive dynamic programming (ADP) without using the state of the machine.

8. The control system of claim 7, wherein the ADP determines an approximate solution of Hamilton-Jacobi-Bellman (HJB) equations parameterized over the lifted state space.

9. The control system of claim 8, wherein the parameterization of the HJB equations over the lifted state space includes
parameterization of the state space over the lifted state space;
parameterization of the value function over the lifted state space; and
parameterization of a weighted gradient of the control policy over the lifted state space.

10. The control system of claim 9, wherein the ADP determines the approximate solution by iteratively
determining the value function of the lifted state; and
determining the weighted gradient of the control policy using the value function determined for multiple time instances; and
updating the control policy according to the weighted gradient.

11. The control system of claim 10, wherein the weighted gradient is determined for the control policy perturbed with a perturbation signal.

12. The control system of claim 10, wherein the value function is parameterized on the lifted state space using basis functions with unknown coefficients, wherein the determining of the value function includes determining the coefficients of the basis functions by solving a machine of linear equations formed by
integrating the basis functions of the value function over the sequence of time instances; and
integrating a cost function of the control policy over the sequence of time instances.

13. The control system of claim 10, wherein the weighted gradient is parameterized on the lifted state space using basis functions with unknown coefficients, wherein the determining of the weighted gradient includes determining the coefficients of the basis functions by solving a machine of linear equations formed by
determining a sequence of the value functions for a sequence of time instances;
integrating the basis functions of the weighted gradient over the sequence of time instances; and
integrating a cost function of the control policy over the sequence of time instances.

14. The control system of claim 8, wherein the parameterizations are linear over functional spaces, wherein each element at each functional space is a differentiable function of the lifted state, wherein the functional spaces include all continuous functions of the lifted state space.

15. The control system of claim 14, wherein basis functions of the functional spaces are polynomial functions of the lifted state.

16. The control system of claim 1, wherein the control policy is initialized as a proportional and derivative control.

17. A control method for controlling a machine, wherein the method uses a processor coupled with stored instructions implementing the method, wherein the instructions, when executed by the processor carry out at least some steps of the method, comprising:

controlling a machine according to a control policy parameterized on a lifted state space of the machine having an unknown onto mapping to a state space of the machine, wherein a state of the machine is an instance in the state space that uniquely defines the machine at a time instance, wherein a lifted state of the machine is an instance in the lifted state space that defines the machine at the time instance, such that the lifted state at the time instance has the unknown onto mapping to the state of the machine at the time instance;

accepting a sequence of measurements of state variables measured over a sequence of time instances, the state variables measured for the time instance form a portion of the state of the machine at the time instance;

determining, for the time instance, a derivative of at least one measured state variable using values of the state variable measured for multiple time instances, wherein a combination of the measured state variables and the derivative of the at least one measured state variable defines the lifted state for the time instance; and updating the control policy by evaluating a value function of the control policy using the lifted states, such that the controller determines a control input to the machine using the lifted state and the updated control policy.

18. The control method of claim 17, wherein the controlled machine is an electric motor, the state of the electric motor includes a current through the motor, a speed of a rotor of the motor, and a flux of the motor, wherein the measured state variables are the current and the speed of the motor, wherein the lifted state of the electric motor is formed by values of the current, the derivative of the current, the speed, and the derivative of the speed of the motor.

19. A non-transitory computer readable storage medium embodied thereon a program executable by a processor for performing a method, the method comprising:

controlling a machine according to a control policy parameterized on a lifted state space of the machine having an unknown onto mapping to a state space of the machine, wherein a state of the machine is an instance in the state space that uniquely defines the machine at a time instance, wherein a lifted state of the machine is an instance in the lifted state space that defines the machine at the time instance, such that the lifted state at the time instance has the unknown onto mapping to the state of the machine at the time instance;

accepting a sequence of measurements of state variables measured over a sequence of time instances, the state variables measured for the time instance form a portion of the state of the machine at the time instance;

determining, for the time instance, a derivative of at least one measured state variable using values of the state variable measured for multiple time instances, wherein a combination of the measured state variables and the derivative of the at least one measured state variable defines the lifted state for the time instance; and updating the control policy by evaluating a value function of the control policy using the lifted states, such that the controller determines a control input to the machine using the lifted state and the updated control policy.

20. The storage medium of claim 19, wherein the controlled machine is an electric motor, the state of the electric motor includes a current through the motor, a speed of a rotor of the motor, and a flux of the motor, wherein the measured state variables are the current and the speed of the motor, wherein the lifted state of the electric motor is formed by values of the current, the derivative of the current, the speed, and the derivative of the speed of the motor.

* * * * *